(12) United States Patent
Boire-Lavigne et al.

(10) Patent No.: US 9,350,699 B2
(45) Date of Patent: May 24, 2016

(54) SCALABLE NAT TRAVERSAL

(71) Applicant: Sagem-Interstar, Inc., Montreal (CA)

(72) Inventors: Sébastien Boire-Lavigne, Montréal (CA); Richard Collette, Laval (CA); Sébastien Lalonde, St-Lazare (CA); Éric Malenfant, Montréal (CA)

(73) Assignee: XMedius Solutions Inc., Montreal (CA)

( * ) Notice: Subject to any disclaimer, the term of this patent is extended or adjusted under 35 U.S.C. 154(b) by 68 days.

(21) Appl. No.: 14/339,598

(22) Filed: Jul. 24, 2014

(65) Prior Publication Data

US 2014/0334481 A1    Nov. 13, 2014

Related U.S. Application Data

(63) Continuation of application No. 12/701,147, filed on Feb. 5, 2010, now Pat. No. 8,825,822.

(60) Provisional application No. 61/150,378, filed on Feb. 6, 2009.

(51) Int. Cl.
*H04L 29/12* (2006.01)
*H04L 29/06* (2006.01)
*H04L 12/721* (2013.01)

(52) U.S. Cl.
CPC .......... *H04L 61/2567* (2013.01); *H04L 29/125* (2013.01); *H04L 29/12528* (2013.01); *H04L 45/72* (2013.01); *H04L 61/2564* (2013.01); *H04L 61/2575* (2013.01); *H04L 63/029* (2013.01); *H04L 65/1006* (2013.01); *H04L 65/1069* (2013.01); *H04L 61/2589* (2013.01)

(58) Field of Classification Search
CPC ...................................... H04L 63/029
See application file for complete search history.

(56) References Cited

U.S. PATENT DOCUMENTS

| | | | |
|---|---|---|---|
| 7,020,130 | B2 | 3/2006 | Krause et al. |
| 7,920,549 | B2 | 4/2011 | Alt et al. |
| 8,090,858 | B2 | 1/2012 | Pöyhönen et al. |
| 8,130,760 | B2 | 3/2012 | Xu et al. |
| 8,200,827 | B1 | 6/2012 | Hunyady et al. |
| 8,443,090 | B2 | 5/2013 | Abuan et al. |
| 2002/0199114 | A1 | 12/2002 | Schwartz |
| 2003/0154306 | A1 | 8/2003 | Perry |
| 2003/0165136 | A1 | 9/2003 | Cornelius et al. |
| 2003/0227903 | A1 | 12/2003 | Watson |
| 2003/0233471 | A1 | 12/2003 | Mitchell et al. |
| 2004/0128554 | A1 | 7/2004 | Maher, III et al. |
| 2005/0210292 | A1 | 9/2005 | Adams et al. |
| 2005/0238034 | A1 | 10/2005 | Gillespie et al. |

(Continued)

*Primary Examiner* — Andrew Lai
*Assistant Examiner* — Jamaal Henson
(74) *Attorney, Agent, or Firm* — Coats & Bennett, PLLC

(57) ABSTRACT

A system and method for traversing a firewall for a voice-over-IP session or other communication session uses four main components: a relay agent, and NAT 30Agent, a SIP proxy and a application server. The SIP proxy is located in the public network and SIP signaling messages are routed through the SIP proxy. The sever opens ports in the firewall for signaling between the SIP proxy and the relay agent behind the firewall. The application server also opens ports in the firewall for media traffic. The NAT 30Agent disposed in the path from the firewall to the Internet filters media packets and changes the public source address of the media packets to a predetermined address associated with the open media port.

2 Claims, 16 Drawing Sheets

(56) References Cited

U.S. PATENT DOCUMENTS

| | | |
|---|---|---|
| 2006/0098622 A1 | 5/2006 | Chang et al. |
| 2006/0209794 A1 | 9/2006 | Bae et al. |
| 2006/0215684 A1 | 9/2006 | Capone |
| 2007/0157303 A1 | 7/2007 | Pankratov |
| 2008/0037537 A1 | 2/2008 | Yao et al. |
| 2008/0148379 A1* | 6/2008 | Xu ............... H04L 29/125 726/11 |
| 2008/0267096 A1* | 10/2008 | Nakamura ......... H04L 12/4633 370/261 |
| 2009/0157887 A1 | 6/2009 | Froment et al. |
| 2009/0323559 A1* | 12/2009 | Chen ............... H04L 29/12377 370/259 |
| 2010/0228779 A1 | 9/2010 | Sim et al. |
| 2011/0078781 A1 | 3/2011 | Chou et al. |

* cited by examiner

SCALABLE NAT TRAVERSAL

RELATED APPLICATIONS

This application is a continuation of U.S. patent application Ser. No. 12/701,147, filed Feb. 5, 2010, which claims the benefit of U.S. Provisional Patent Application 61/150,378, filed Feb. 6, 2009, which is incorporated herein by reference.

BACKGROUND

The present invention relates generally to traversal of a network address translator and, more particularly, to a scalable solution for traversing a symmetric network address translator for VoIP (VoIP) and other communication sessions.

The Internet is a global system of many interconnected computer networks, both public and private. The Internet allows direct end-to-end connectivity between two devices or end points using standard protocols such as the Internet Protocol (IP), Transmission Control Protocol (TCP), and User Datagram Protocol (UDP). Each device connected to the Internet is assigned an IP address which enables the routing of data packets. Currently, most devices use the address scheme specified in the Internet Protocol Version 4 (IPv4). The open architecture and near universal accessibility of the Internet has led to widespread adoption and use of the Internet by businesses and individuals.

The features that make the Internet so popular also contribute to some of its drawbacks. For example, the universal access and direct end-to-end connectivity enable users on opposite sides of the globe to communicate directly with one another, but exposes computers to hackers and other malicious third parties. The direct end-to-end connectivity also requires that each end device be given a unique IP address. However, the widespread adoption of the Internet has led to depletion of available addresses in the IPV4 address space.

To address security concerns, most private business and home networks now implement some form of firewall. A firewall comprises hardware and/or software that is designed to block unauthorized access to a protected network while permitting authorized communications with users outside the firewall. Firewalls protect against unauthorized access by applying a predefined security policy to packets entering a protected network. The security policy comprises a set of rules and procedures governing data packets entering or exiting the protected network. The firewall allows packets to pass through the firewall based on the specific rules of the defined policy. Most often, a firewall allows most outgoing packets originating inside the protected network to pass through the firewall while blocking most incoming packets from the public network. Data traffic from the public networks is allowed to pass only if it conforms to a defined access control filter, is sent in response to an outgoing data packet, or is part of an already-established communication session.

The problem of address exhaustion is typically handled by using a technique called network address translation (NAT). Network address translation is commonly implemented in conjunction with firewalls as part of an overall network security arrangement. Network address translation allows devices connected to a private network to share a single IP address. The basic idea behind network address translation is to assign private address from a private address space to devices connected to the private network. Because the private addresses use a different address space than the public Internet, packets containing a private address cannot be routed through the Internet. In order to allow a device with a private IP address to communicate with other devices on the Internet, a NAT (network address translator) translates private source and destination addresses of packets valid in the private address space to public source and destination addresses valid in the public address space.

There are many different NAT implementations, each affecting higher layer communication protocols differently. The present invention addresses problems with traversing symmetric NATs, although the invention may be used with other types of NAT implementations. In a symmetric NAT, each request from the same private IP address and port to a specific destination IP address and port is mapped to a unique public source IP address and port. If the same internal host sends a data packet with the same private source address and port, but to a different public IP address or port, a different mapping is used. In a symmetric NAT, data packets sent by an external host will be passed only if the internal host has previously Invited a response from the external host sending the data packet. Uninvited data packets from an external host will be blocked by the NAT.

While network address translation works well with many commonly used protocols, such as HTTP, POP, and SMTP, it may create problems for some application level communication protocols that send explicit network addresses within their payload. For instance, the Session Initiation Protocol (SIP) is a signaling protocol used to set up, maintain, and terminate voice-over IP (VoIP) sessions. A typical VoIP application will use different addresses and/or ports for signaling traffic and media traffic such as voice, video, and fax traffic. To set up the VoIP session, the call originator invites the called party to participate in a call by sending a SIP INVITE request. The called party accepts the invitation by sending a SIP RESPONSE message. The SIP INVITE and SIP RESPONSE messages typically include specific addresses and ports that are being opened for the RTP (media) traffic.

In the case where the called party is behind a symmetric NAT, the SIP INVITE request will be blocked by the NAT and never reach the called party. Even if the called party is reachable, the SIP Response from called party may be blocked in situations where the calling party is behind a symmetric firewall/NAT. Further, the VoIP application will typically use a different IP address and port for sending and receiving RTP or RCTP traffic, e.g., voice data. The VoIP client has no way of knowing the external address assigned by the NAT for the RTP and RTCP traffic.

A number of techniques have been used to solve the NAT traversal problem for voice-over IP communications. One solution is to use an application level gateway (ALG). An application level gateway is a software component that allows examination and modification of data packets passing through the NAT. In the case of SIP protocol packets, the ALG can replace private source and destination addresses contained in the payload of SIP messages with public source and destination addresses. This technique does not ensure security or authenticity and is difficult to deploy because the ALG must have knowledge of the application level protocols. Thus, a separate ALG is typically required for each application.

A network protocol called STUN (Session Traversal Utilities for NAT) described in RFC 5389 allows a host device in a private network to discover the presence of a network address translator and to obtain the public NAT address that was allocated for the user's UDP connection to a remote host. A client device generates and sends a STUN request to a STUN application server in the public network prior to setting up communication with a remote host. The request causes the NAT to allocate a public address and create a binding between the public address and the private source address of the STUN request. The STUN application server sends a STUN response to the client and, within its payload, returns the public NAT address allocated by the NAT. The client may then advertise this public address as the address on which it will receive UDP packets (both for signaling and media packets). The STUN protocol does not work with a symmetric firewall in situations where the client will be receiving packets from public addresses other then the public address of the STUN application server.

A protocol called TURN (Traversal Using Relay NAT) provides an application server function to a client behind a NAT to allow the client to receive incoming data over TCP or UDP connections. Similar to STUN, a client sends a request to a TURN application server prior to setting up communication with a remote host. The TURN application server returns to the client the address that it can use as the destination for media, which the client uses as the destination address for packets sent to the remote host. The destination address returned is not the address of the remote host, but instead, is an address associated with the TURN application server. The TURN application server acts as a relay and forwards the packet. Although TURN provides a solution to the NAT traversal problem, it requires that all packets be relayed by the TURN application server, and thus is not easily scalable. While network delays induced by the introduction of additional network hops is typically not significant enough to affect the SIP signaling, media packets should be delivered with minimal delays. Therefore, a solution that reduces the number of hops, and therefore the overall delay, is preferable.

A session border controller (SBC) is a device used in some VoIP networks to traverse a network address translator. The SBC is a session-aware device that provides both media proxy and session control functions. The SBC is essentially a proxy that establishes call legs in two different networks. The SBC receives packets on one call leg and forwards them toward the destination on the other call leg. Because the SBC modifies the addresses, it may break some security mechanisms. Also, session border controllers are expensive, difficult to deploy, and not easily scalable because all packets must be relayed through the SBC.

SUMMARY

The present invention provides a system and method for traversing a symmetric NAT for VoIP and other communication sessions. The system and method uses four main components: a relay agent, a NAT agent, a SIP proxy, and an application server. The relay agent is located behind the firewall/NAT in a private network and is configured to communicate with the SIP proxy located in the public network. The relay agent routes SIP signaling messages through the SIP proxy. The application server requests the relay agent to open signaling ports in the firewall/NAT for signaling between the SIP proxy and the relay agent. The application server also requests the relay agents to open ports in the firewall/NAT for media traffic. The NAT agent disposed in the path from the firewall/NAT to the Internet filters media packets and changes the public source address of incoming media packets to a predetermined address associated with the open media port.

DETAILED DESCRIPTION

Figure 1:
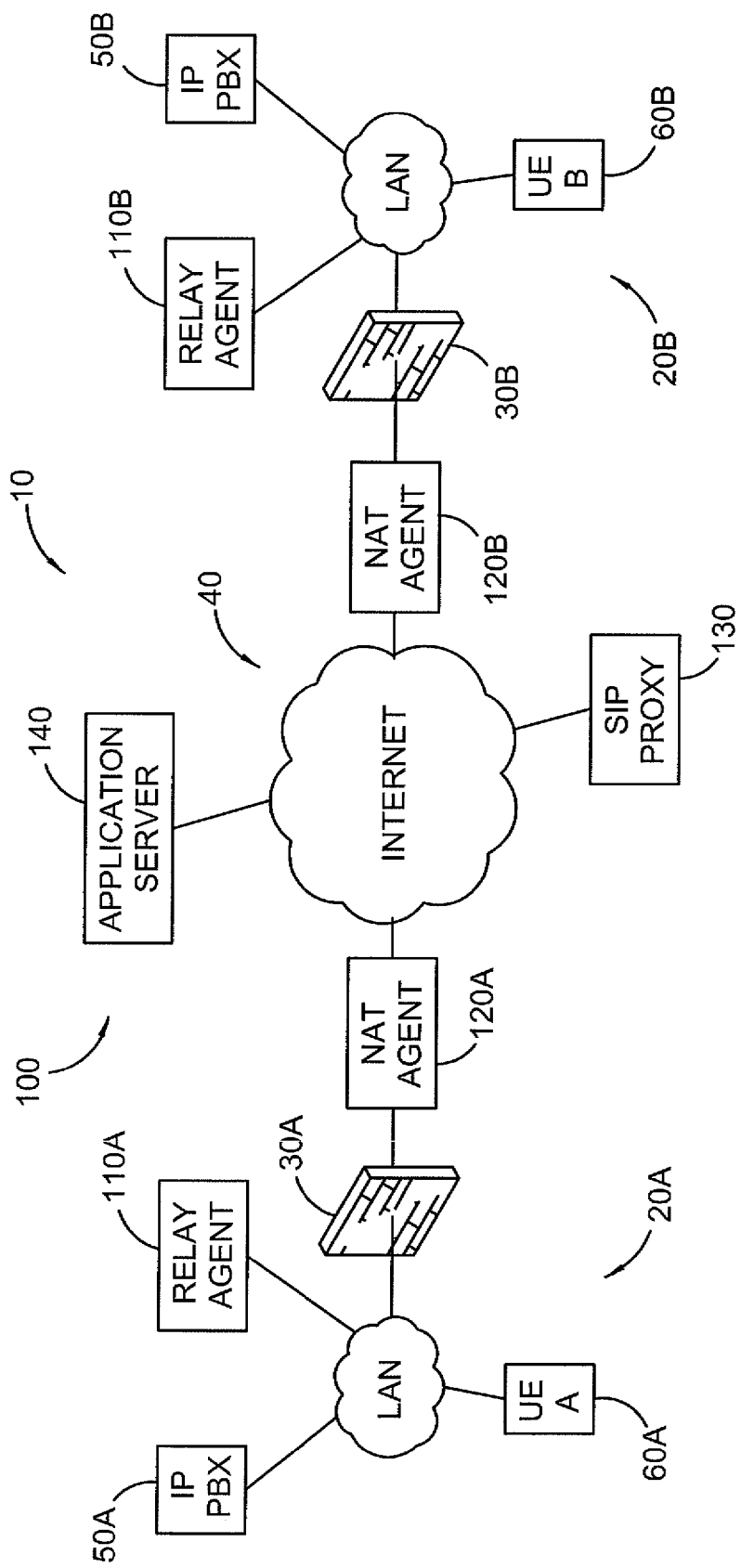
FIG. 1 illustrates an exemplary communication network incorporating a NAT traversal system according to one embodiment.

Referring now to the drawings, FIG. 1 illustrates a communication network 10 configured in accordance with one exemplary embodiment of the present invention. The communication network 10 comprises two private networks 20 interconnected with a public network 40, such as the Internet. For purposes of clarity, a reference number in the following description may be followed by either the letter A to designate elements associated with the calling party, referred to herein as User A, or the letter B to designate elements associated with the called party, referred to herein as User B. Thus, private network 20A refers to the calling party's network, while private network 20B refers to the called party's private network. When discussing elements generically, the reference number may be used without a letter. Also, it is noted that the term "address" as used herein refers to a fully qualified network address containing both an IP address and port number. The term "IP address" refers to the network address without the port number.

Each private network 20A, 20B includes a firewall/NAT 30A, 30B to provide security and protect against unauthorized access to the private network 20A, 20B. In this embodiment, the firewall/NAT 30A, 30B contains hardware and/or software for implementing a symmetric NAT, although the use of a symmetric NAT is not material to the invention. The present invention can be used in conjunction with other NAT implementations.

Each network 20A, 20B includes an IP (Internet Protocol) PBX (private branch exchange) 50A, 50B that interconnects with the public switched telephone network (PSTN) and allows voice and data to be delivered over the PSTN. The IP PBX 50A, 50B may comprise any conventional VoIP gateway implementing standard VoIP protocols, such as the Session Initiation Protocol (SIP) and RTP. The IP PBX 50A, 50B may be used to establish calls between users 60A, 60B in networks 20A, 20B over the public network 40 rather than the PSTN. As described in the background, the presence of the symmetric firewall/NAT 30A, 30B at the boundaries of each private network 20A, 20B may prevent a voice-over IP session from being established.

Figure 2:
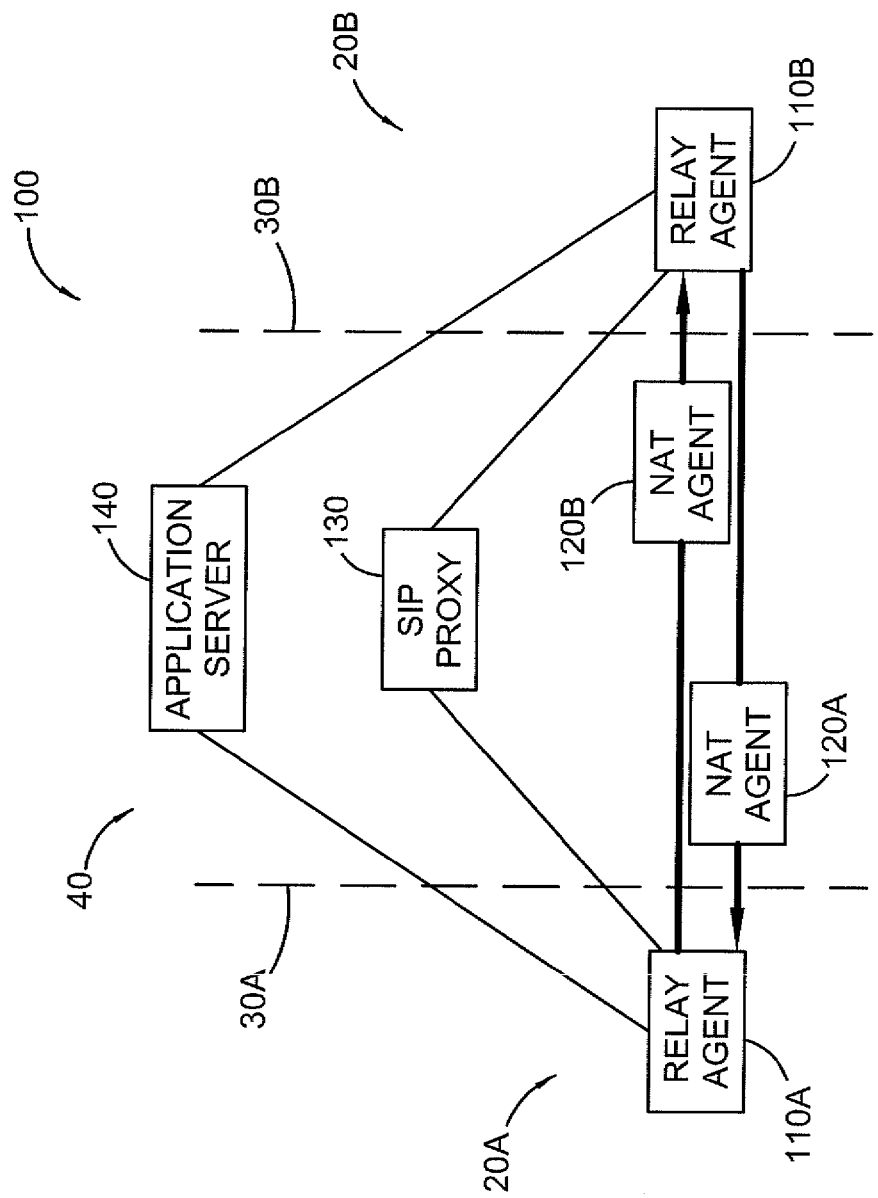
FIG. 2 illustrates the main components of a NAT traversal system according to one exemplary invention and the signal flow between components.

The communication network 10 includes a system 100 for traversing the firewall/NAT 30A, 30B for VoIP communications as shown in FIG. 2. The present invention could also be applied in other applications where address information is carried in the payload of data packets. The system 100 comprises four types of components: relay agents 110A, 110B that reside in the private networks 20A, 20B respectively, NAT agents 120A, 120B that intercept packets arriving from the public network 40 before they cross the firewall/NATs 30A, 30B respectively, a proxy server 130 in the public network 40, and a application server 140 in the public network 40. The Nat agents 120A, 120B also play a role in opening ports in the firewalls 30A, 30B.

The relay agents 110A, 110B may be implemented as software on a host device, e.g., computer, in a private network 20A, 20B. The relay agents 110A, 110B may, for example, reside in the same host device as the IP PBX 50A, 50B, or may reside in a separate host device. The relay agents 110A, 110B could also reside in the user equipment (UE). The relay agents 110A, 110B can work in a cluster arrangement to provide a fault tolerant architecture.

The SIP proxy 130 and application server 140 may be implemented as software on a computer connected to the public network 40. The SIP proxy 130 and application server 140 may reside in the same computer, or in separate computers. Also, the functionality of the SIP proxy 130 and/or application server 140 could be distributed among several computers or processors, or in a cluster of application servers.

The NAT Agents 120A, 120B are essentially packet filters with a few relatively simple functions that may be implemented with software. The relay agents 110A, 110B and NAT Agents 120A, 120B perform a few relatively simple functions, while the bulk of the logic is contained in the SIP proxy 130 and application server 140. This architecture provides an easily scalable solution for traversing a symmetric firewall/NAT 30A, 30B.

As will be hereinafter described in greater detail, the relay agents 110A, 110B relay SIP signaling to and from respective IP PBXs 50A, 50B. The relay agents 110A, 110B relay outgoing signaling packets received from the IP PBXs 50A, 50B to the SIP proxy 130 in the public network 40. Similarly, the relay agents 110A, 110B receive SIP signaling packets from the SIP proxy 130 on behalf of respective IP PBX 50A, 50B and relay the incoming SIP signaling messages to the IP PBX 50A, 50B. The relay agent 110A, 110B does not need to analyze the packet contents to perform the relay function.

NAT Agents 120A, 120B are disposed in the traffic path between the private networks 20A, 20B and the public network 40 and intercept incoming packets before crossing the firewall of the protected network 20A, 20B. In the embodiment shown in FIG. 1, NAT Agent 120A intercepts media packets transmitted by User B to User A, while NAT Agent 120B intercepts media packets transmitted by User A to User B. The NAT Agents 120A, 120B translate source addresses contained in the media packets to ensure that the addresses comply with policies and rules implemented by the firewall/NATs 30A, 30B.

The SIP proxy 130 and application server 140 facilitate the establishment of the VoIP session. All SIP signaling passes through the SIP proxy 130. The SIP proxy 130 receives SIP signaling message from the relay agent 110A or relay agent 110B, modifies the address information contained in the SIP signaling messages, and forwards the signaling messages to the relay agent 110B or relay agent 110A.

The application server 140 communicates with the SIP proxy 130 and relay agents 110A, 110B in both private networks 20A, 20B. A TCP connection is established between relay agents 110A, 110B and the application server 140, through the firewalls 30A, 30B. This connection is kept open so that the application server 140 can send requests to the relay agents 110A, 110B as will be hereinafter described. The primary function of the application server 140 is to authorize and facilitate SIP sessions and to coordinate with the relay agents 110A, 110B to open ports in the firewall/NATs 30A, 30B for both signaling and media traffic, to obtain public addresses associated with the opened ports, and to provide the addresses of the ports opened for signaling to the SIP proxy 130.

FIGS. 3-9 illustrate exemplary procedures according to one embodiment of the present invention for traversing a firewall/NAT 30A, 30B using a symmetric NAT. In this example, it is assumed that a User A on private network A is attempting to establish a call with a second User B on private network B. It is further assumed that both private network 20A and private network 20B include a firewall/NAT 30A, 30B using a symmetric NAT. These circumstances are probably the most difficult for NAT traversal. The present invention may also be used when a firewall/NAT is present at only one end of the communication, or with other types of NAT implementations. Therefore, the exemplary embodiment described herein should not be construed as limiting the invention.

Figure 3:
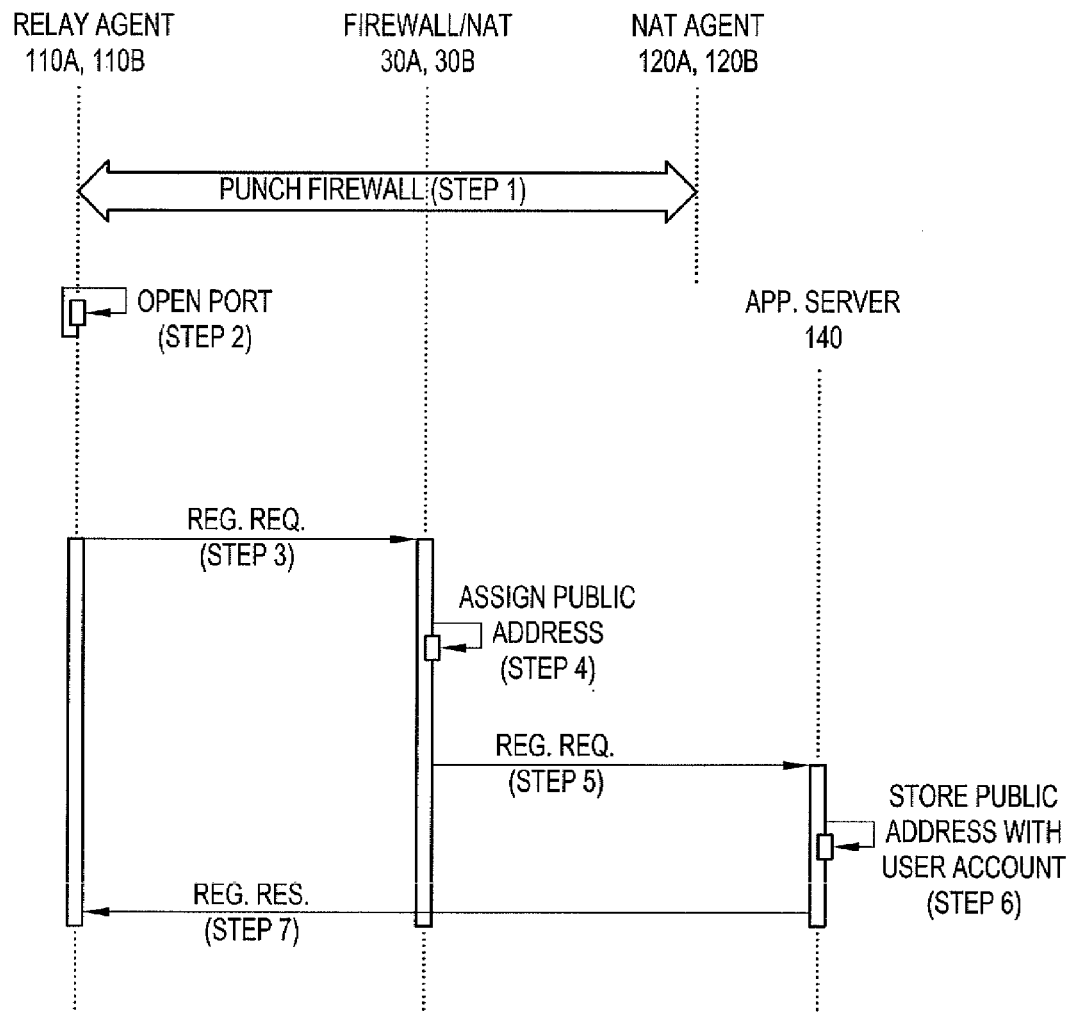
FIG. 3 illustrates a registration procedure used to register a user with the application server and for opening a connection between the application server and a relay agent.

To implement the NAT traversal, the relay agents 110A, 110B must first register with the application server 140 and establish a communication channel with the application server 140. It is assumed that user accounts have already been established during a subscription procedure. FIG. 3 illustrates an exemplary registration procedure. To begin the registration procedure, the relay agent 110A, 110B performs a firewall punching procedure to discover the public IP address (natip) of the firewall/NAT 30A, 30B (step 1). The firewall punching procedure is described in more detail below. Because the relay agent 110A, 110B is only interested in discovering the IP address of the firewall/NAT 30A, 30B, the connection opened by the firewall/punching procedure is not maintained. The relay agent 110A, 110B stores the IP address of the firewall/NAT 30A, 30B. Next, the relay agent 110A, 110B opens one or more local ports and starts a proxy processor that relays outbound packets received on the opened ports to the SIP Proxy 130 (step 2). As an example, the relay agent 110A, 110B, may choose ports 5060 and 7000 to facilitate integration with other SIP devices. To establish a TCP connection with the application server 140, the relay agent 110A, 110B sends a registration request to the application server 140 (step 3). The registration request includes the AccountID and password for the user being registered, the IP address (natip) of the firewall/NAT 30A, 30B discovered during the firewall punching procedure, and the private address on which the PBX agent 110A, 110B would like to receive SIP requests.

Upon receipt of the outbound registration request, the firewall/NAT 30A, 30B allocates a port on the firewall/NAT 30A, 30B and creates an entry in its NATing table that associates the public address of the port with the private address of the relay agent 110A, 110B from which the registration request was sent (step 4). The firewall/NAT 30A, 30B, forwards the registration request to the application server 140 (step 5). When the server 140 receives the registration request, it finds the account specified by the AccountID and performs authentication using the password in the registration request. If the authentication is successful, the application server 140 stores the public source address of the registration request and the public IP address (natip) of the firewall/NAT 30A, 30B contained in the registration request (step 6). The application server 140 sends a registration response to the relay agent 110A, 110B to indicate that the registration was successful (step 7).

Figure 4:
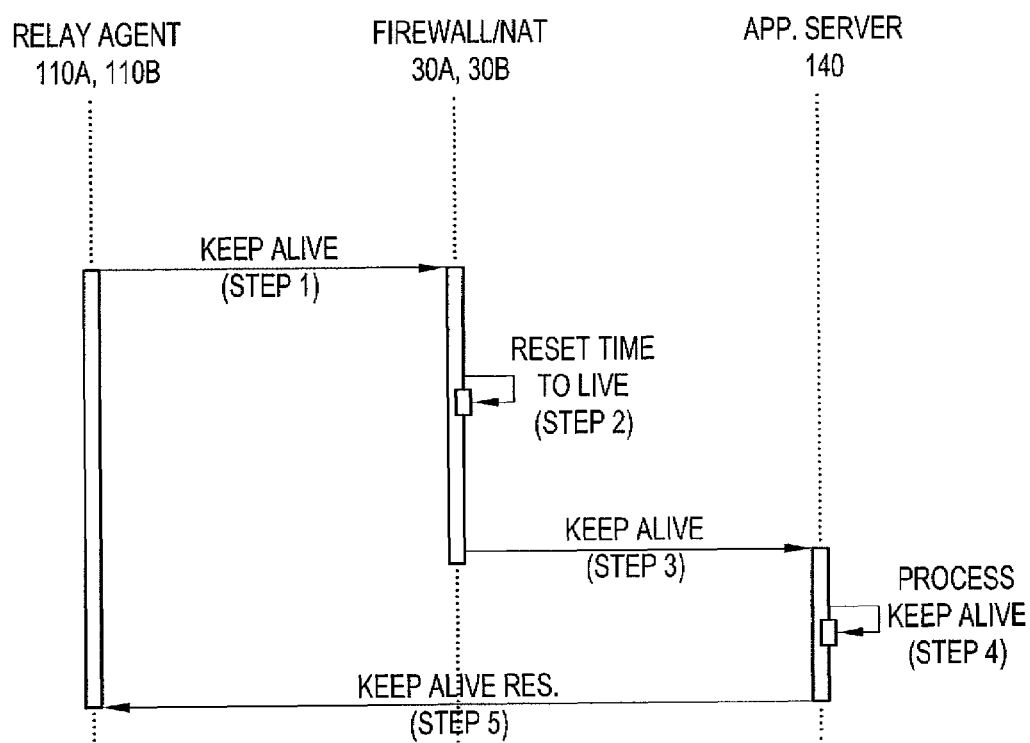
FIG. 4 illustrates a procedure for maintaining a signaling connection between the NAT application server and a relay agent.
Figure 5A:
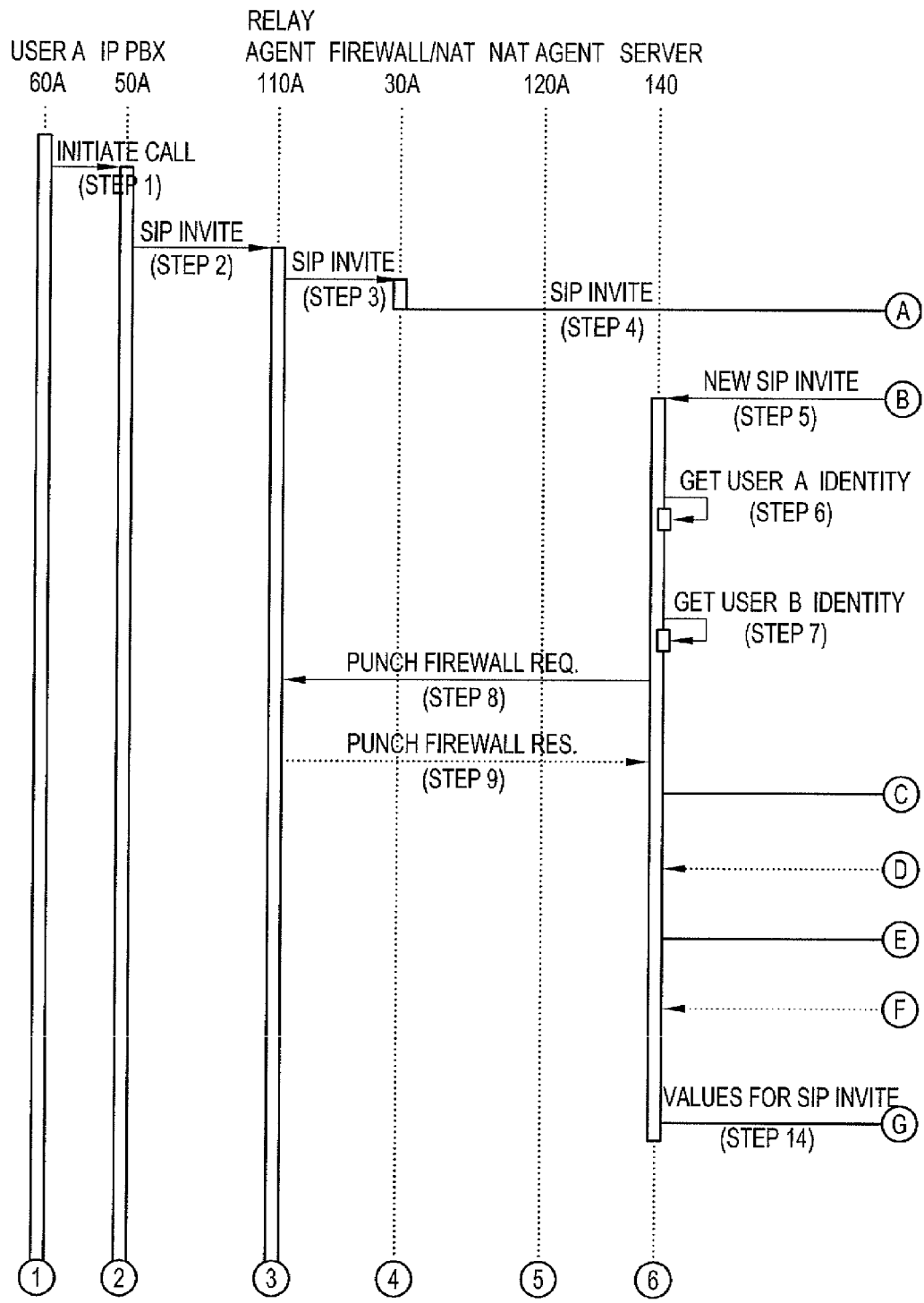
FIGS. 5A-5D illustrate a procedure for establishing a communication session through a firewall according to one exemplary embodiment.
Figure 5B:
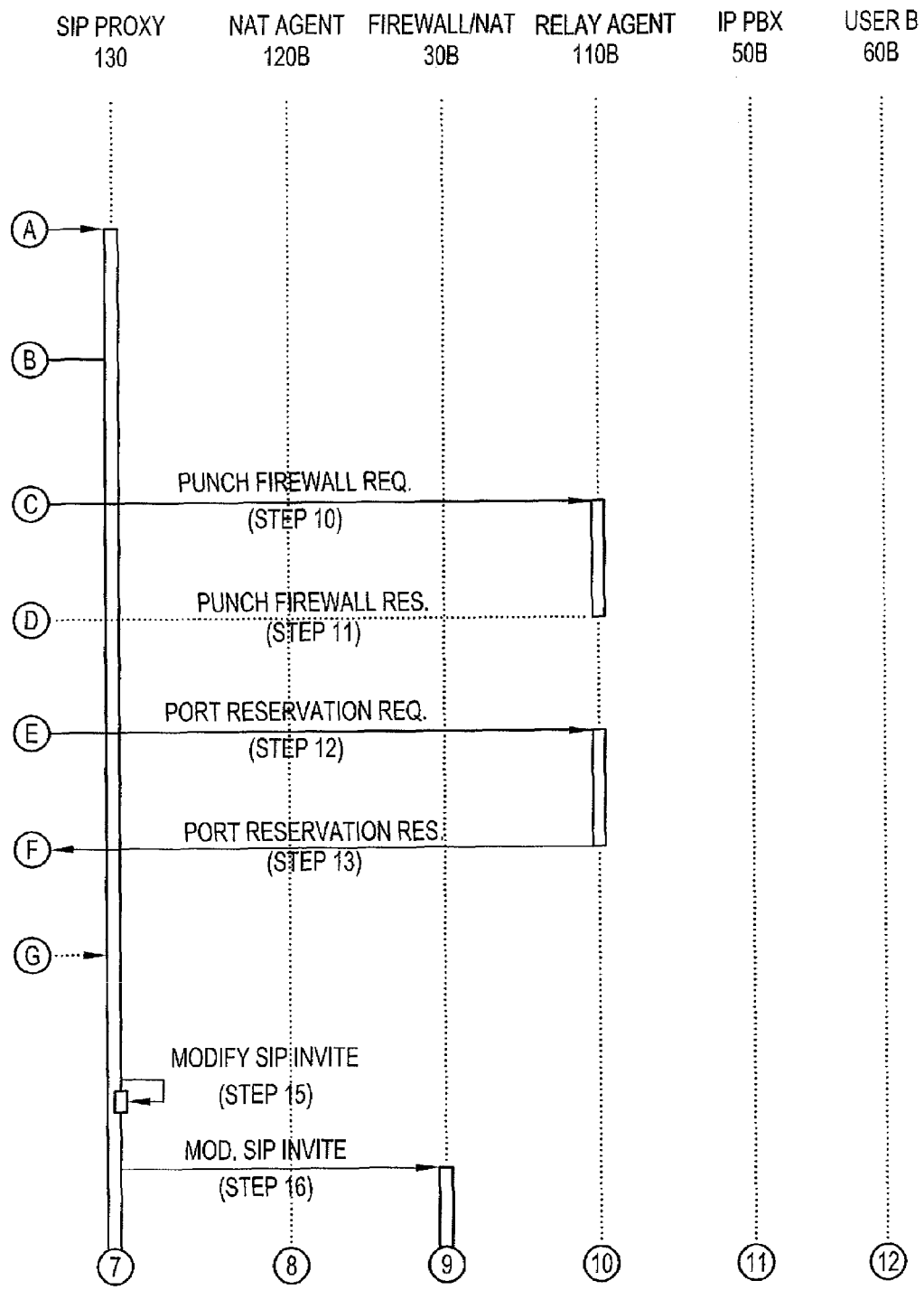
Figure 5C:
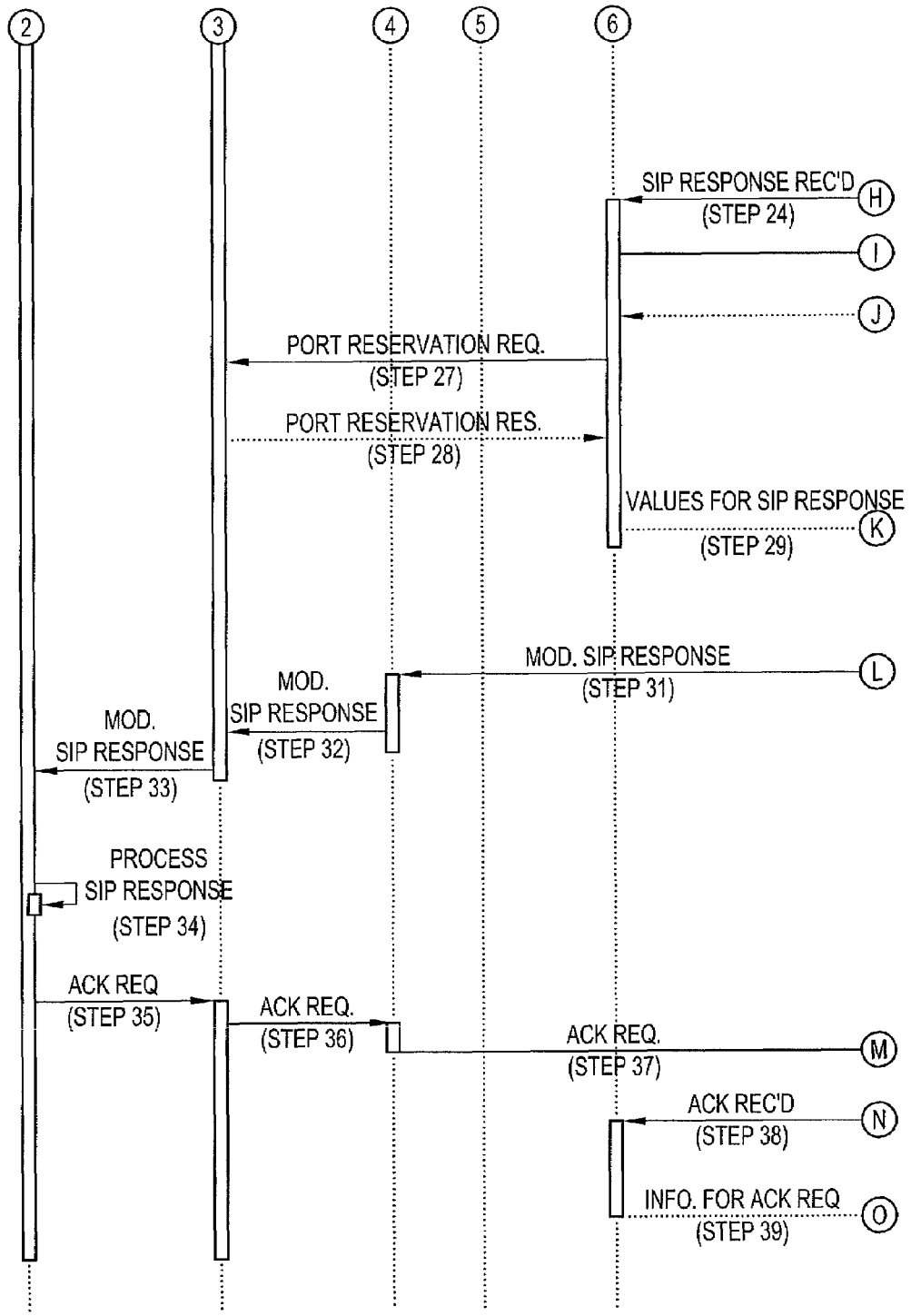
Figure 5D:
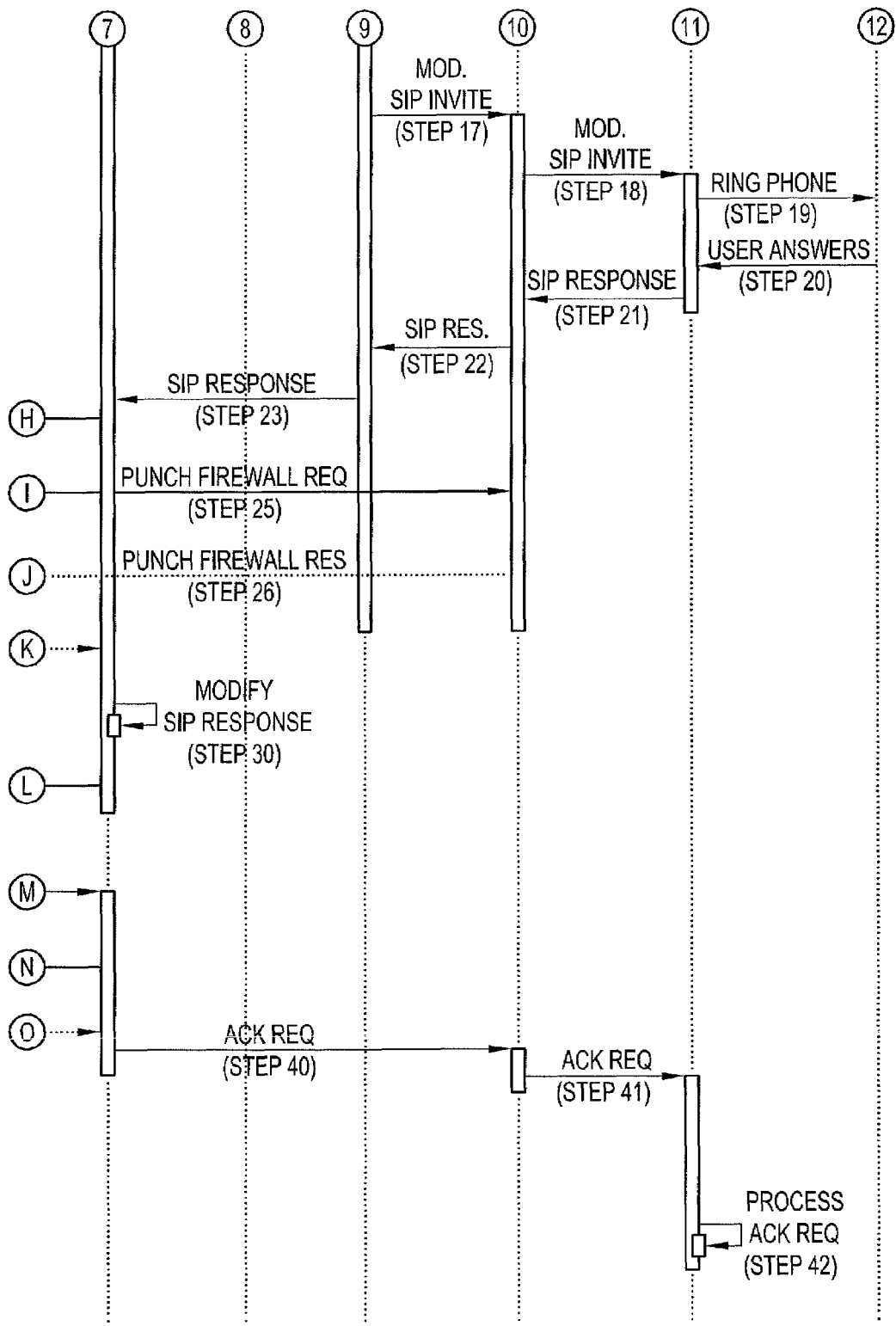

Once the TCP connection with the application server 140 is opened, the relay agent 110A, 110B periodically executes a keep alive procedure as shown in FIG. 4 to maintain the TCP connection with the application server 140. The keep alive procedure also ensures that the port at the firewall/NAT 30A, 30B is kept open. The relay agent 110A, 110B sends a keep alive message to the application server 140 (step 1). The firewall/NAT 30A, 30B intercepts the packet, resets the time to live for the TCP connection between the public and private address of the relay agent (step 2), and forwards the keep alive message to the application server 140 (step 3). The keep alive message indicates to the application server 140 that the relay agent 110A, 110B is still available and that signaling for VoIP calls can be forwarded to the relay agent. The application server 140 may send a keep alive response to indicate to the relay agent 110A, 110B that the TCP connection is still open.

The application server 140 can use the TCP connection opened during the registration procedure to send future firewall punching requests to the relay agent 110A, 110B to open ports for signaling and media connections for VoIP sessions in the firewall/NAT 30A, 30B as will be hereinafter described. The TCP connections between the relay agents 110A, 110B and the application server 140 can be secured using SSL transport.

FIGS. 5A-5D illustrate an exemplary procedure for establishing a VoIP call between User A and User B. To provide a concrete example, the addresses of the entities involved in the call will be as follows:

| | |
|---|---|
| Private address of User A equipment (for RTP) | 192.168.1.200:24580 |
| Private address of IP PBX A | 192.168.1.100:5060 |
| Private address of relay agent 110A | 192.168.1.50:5060 |
| Private address of User B equipment (for RTP) | 192.168.2.200:24582 |
| Private address of IP PBX B | 192.168.2.100:5060 |
| Private address of relay agent 110B | 192.168.2.50:5060 |
| Public address of SIP proxy 130 | 216.218.42.170:7000 |
| Public address of application server 140 | 216.218.42.170:8888 |

The public IP address if firewall/NAT 30A is 216.218.42.173 and the public IP address if firewall/NAT 30B is 216.218.42.172

The procedure begins when User A (the calling party) initiates a VoIP call by calling the public phone number (e.g., 514-666-1000) of User B (step 1). When the call is initiated, IP PBX A 50A generates a SIP Invite request and sends the SIP Invite request on a SIP trunk to relay agent 110A (step 2). IP PBX 50A for User A is configured to use a SIP trunk that points to the address of the relay agent 110A. An exemplary SIP Invite request is given below.

```
INVITE sip:5146661000@dc.acme.com:5060 SIP/2.0
Via: SIP/2.0/UDP 192.168.1.100:5060;branch=z9hG4bK241f491779
Remote-Party-ID: <sip:1000@192.168.1.100>;party=calling;screen=yes;
privacy=off
From: <sip:1000@192.168.1.100>;tag=cfa850bf-a180-4e71-9b81-
62d43df3a4f0-21178205
To: <sip:5146661000@dc.acme.com>
Date: Fri, 29 Jan. 2010 20:10:13 GMT
Call-ID: 4dc24600-b63140a5-18-6401a8c0@192.168.1.100
Supported: timer,replaces
Min-SE: 1800
User-Agent: Cisco-CCM6.0
Allow: INVITE, OPTIONS, INFO, BYE, CANCEL, ACK, PRACK,
UPDATE, REFER, SUBSCRIBE, NOTIFY, PUBLISH
```

-continued

```
CSeq: 101 INVITE
Contact: <sip:1000@192.168.1.100:5060>
Expires: 180
Allow-Events: presence, kpml
Session-Expires: 1800
Max-Forwards: 70
Content-Type: application/sdp
Content-Length: 214
v=0
o=CiscoSystemsCCM-SIP 2000 1 IN IP4 192.168.1.100
s=SIP Call
c=IN IP4 192.168.1.200
t=0 0
m=audio 24580 RTP/AVP 0 101
a=rtpmap:0 PCMU/8000
a=ptime:20
a=rtpmap:101 telephone-event/8000
a=fmtp:101 0-15
```

At this point, the request line of the SIP Invite request contains the SIP URI of User B (the called party), and the CONTACT header field and VIA header field contain the private address of IP PBX 50A. The media description contains the private address of User's A's user equipment (UE A) for the media connection.

The relay agent 110A receives the SIP Invite request on port 5060 and relays the SIP Invite request to the public address (216.218.42.170:7000) of the SIP proxy 130 in the public network 40 (step 3). The relay agent 110A is configured to relay all packets received on port 5060 unmodified to the SIP proxy 130. The firewall/NAT 30A intercepts the outgoing packets, changes the source address of the packets to a public address (216.218.42.173:any) of the firewall/NAT 30A, and forwards the packet to the SIP proxy (step 4).

The SIP proxy 130 notifies the application server 140 that a new SIP Invite request has been received from User A (step 5). The application server 140 determines based on the source address of the packet carrying the SIP Invite request that the SIP Invite request originates from a user on private network 20A because the source IP address of the packets matches the address obtained by the application server 140 during registration (step 6). The application server 140 also determines that the phone number in the request URI corresponds to a registered number associated with private network 20B. (step 7).

To enable the VoIP session, the application server 140 needs to open connections through the firewall/NAT 30A for private network 20A for both signaling and media traffic. Two signaling connections and two media connections are needed on the calling side. One signaling connection is needed for the CONTACT specified in the original SIP Invite request to enable the IP PBX 50B to send new SIP requests. Another signaling connection is needed for the VIA specified in the original SIP Invite to enable IP PBX 50B to send a response to the SIP INVITE. Both new SIP requests and responses will be sent through the SIP proxy 130. Separate media connections are also needed for RTP and RTCP traffic respectively.

To open ports at the firewall/NAT 30A, the application server 140 sends one or more punch firewall requests to the relay agent 110A using the TCP connection established during the registration procedure (step 8). Typically, the application server 140 will send a separate punch firewall request for each signaling and media connection. However, the procedure could be modified to allow multiple connections to be established with a single punch firewall request. A punch firewall request has a target information element (IE) to indicate the target device of the punch firewall request. The target IE specifies the public address (or apparent public address) of the target device from which packets will be sent. The punch firewall request also contains a destination IE, which specifies the private destination address of a destination device to which packets will be relayed.

To open a connection for the CONTACT, the application server 140 inserts the public address (216.218.42.170:5060) of the SIP proxy 130 into the target IE and the private address (192.168.1.100:5060) specified in the CONTACT header field of the original SIP Invite into the destination IE. To open a connection for the VIA, the application server 140 inserts the public address (216.218.42.170:5060) of the SIP proxy 130 into the target IE and the private address (192.168.1.100:5060) of IP PBX 50A specified in the VIA header field of the original SIP Invite into the destination IE. For the RTP and RTCP connections, the application server 140 appends port 5353 to the IP address (216.218.42.172) of firewall/NAT 30B and inserts the result into the target IE. The address created is the apparent public source address for media packets from the called party. As will be hereinafter described, media packets arriving at firewall NAT 30A will appear to originate from the apparent public source address. For the RTP and RTCP connections, the application server 140 inserts the private address (192.168.1.200:24580 for RTP and 192.168.1.200:24581 for RTCP) of the calling party's IP phone into the destination IE. The private address of the calling party's IP phone is contained in the SDP of the original SIP Invite request.

In response to each punch firewall request, relay agent 110A implements a firewall punching procedure described in more detail below to open a port for the target device specified by the application server 140 in the target IE of the punch firewall request. During the firewall punching procedure, relay agent 110A learns the public address opened by the firewall/NAT 30A. After ports have been opened for all of the requested connections, relay agent 110A reports the public addresses of the ports opened by firewall/NAT 30A to the application server 140 in one or more punch firewall responses (step 9). In this example, the following ports are opened by firewall/NAT 30 A:

| | |
|---|---|
| CONTACT | 216.218.42.173:2062 |
| VIA | 216.218.42.173:2064 |
| RTP | 216.218.42.173:2066 |
| RTCP | 216.218.42.173:2068 |

As will be described in greater detail below, the firewall punching procedure for the RTP and RTCP connections also creates an entry in the translation table for NAT Agent 120A, which is used to change the source address of media packets from the calling party arriving at the firewall/NAT 30A.

The application server 140 also needs to open a firewall port in network 20B and requests the relay agent 110B to open a signaling connection for SIP signaling. More specifically, an open port in firewall/NAT 30B is needed to enable the SIP Invite request to be delivered. The signaling connection is opened by sending a punch firewall request from the application server 140 to the relay agent 110B (step 10). As previously described, the punch firewall request contains a target IE and a destination IE. The application server 140 inserts the address (216.218.42.170:5060) of the SIP proxy 130 into the target IE to indicate that SIP signaling messages will be sent from the public address of the SIP proxy 130. The destination IE contains a private address (192.168.2.100:5060) of IP PBX 50B. The firewall punching procedure enables relay agent 110B to learn the public address at the firewall/NAT 30B opened for the signaling connection, which is returned in a punch firewall response (step 11). In this example, the address returned for the signaling connection is 216.218.42.172:4811.

The application server 140 also requests relay agent 110B to reserve two ports for outbound RTP and RTCP traffic respectively. To reserve ports at the relay agent 110B, the application server 140 sends a Port Reservation request to relay agent 110B (step 12). The Port Reservation Request includes a destination IE that indicates the public addresses opened by firewall/NAT 30A to which RTP and RTCP packets will be sent. In response to the Port Reservation request, the relay agent 110B reserves ports for outgoing RTP and RTCP traffic. The port reserved for outgoing RTP traffic should be an even port, while the port for RTCP is the next consecutive odd port. The relay agent 110B reports the private addresses reserved for the RTP and RTCP traffic to the application server 140 in responses to the Port Reservation requests (step 13). In this example, the relay agent 110B reserves 192.168.2.50:4814 for RTP traffic and 192.162.2.50:4815 for RTCP traffic.

In response to the notification from the SIP proxy 130, application server 140 returns the reserved addresses obtained to the SIP proxy 130 (step 14) and the SIP proxy 130 modifies the SIP Invite request (step 15). For a simple SIP Invite that contains a voice media description, the following modifications to the SIP Invite are done:

1) The request URI is modified so that it contains the private phone extension for UE B at the private IP PBX address. This address is configured when an account on the application server 140 is established.
2) The media description is modified so that the RTP address points to the address (192.168.2.50:4814) of relay agent 110B opened for RTP traffic so that media traffic will be sent through the relay agent.
3) A first RECORD ROUTE that points to the private address (192.168.1.50:7000) of relay agent 110A is added so that future SIP requests from IP PBX 50A within the same SIP dialog will be sent through relay agent 110A.
4) A second RECORD ROUTE (on top of the previous one) that points to the private address (192.168.2.50:7000) of relay agent 110B is added so that future SIP requests from IP PBX 50B within the same SIP dialog will be sent through relay agent 110B.
5) A topmost VIA that points to the public address (216.218.42.170:7000) of the SIP proxy 130 is added so that SIP response are routed through the SIP proxy 130.

The modified SIP Invite request with changes highlighted is shown below:

```
INVITE sip:1000@192.168.2.100:5060 SIP/2.0
Record-Route: <sip:192.168.2.50:7000;ftag=cfa850bf-a180-4e71-9b81-
62d43df3a4f0-21178205;lr>
Record-Route: <sip:192.168.1.50:7000;ftag=cfa850bf-a180-4e71-9b81-
62d43df3a4f0-21178205;lr>
Via: SIP/2.0/UDP 216.218.42.170:7000;branch=z9hG4bK241f491779
Via: SIP/2.0/UDP
192.168.1.100:5060;received=216.218.42.173;branch=z9hG4bK241f491779
Remote-Party-ID: <sip:1000@192.168.1.100>;party=calling;screen=yes;
privacy=off
From: <sip:1000@192.168.1.100>;tag=cfa850bf-a180-4e71-9b81-
62d43df3a4f0-21178205
To: <sip:5146661000@dc.acme.com>
Date: Fri, 29 Jan. 2010 20:10:13 GMT
Call-ID: 4dc24600-b63140a5-18-6401a8c@192.168.1.100
Supported: timer,replaces
```

-continued

```
Min-SE: 1800
User-Agent: Cisco-CCM6.0
Allow: INVITE, OPTIONS, INFO, BYE, CANCEL, ACK, PRACK,
UPDATE, REFER, SUBSCRIBE, NOTIFY, PUBLISH
CSeq: 101 INVITE
Contact: <sip:1000@192.168.1.100:5060>
Expires: 180
Allow-Events: presence, kpml
Session-Expires: 1800
Max-Forwards: 70
Content-Type: application/sdp
Content-Length: 211 v=0
o=CiscoSystemsCCM-SIP 2000 1 IN IP4 192.168.1.100
s=SIP Call
c=IN IP4 192.168.2.50
t=0 0
m=audio 4814 RTP/AVP 0 101 a=rtpmap:0 PCMU/8000
a=ptime:20
a=rtpmap:101 telephone-event/8000
a=fmtp:101 0-15
```

The SIP proxy 130 sends the modified SIP Invite to the public address (216.218.42.172:4811) of the port that was opened in firewall/NAT 30B to receive the SIP Invite (step 16). The firewall punching procedure previously performed by relay agent 110B created a binding for the public address of the port with the private address of the relay agent 110B. The firewall/NAT 30B maps the public destination address of the SIP Invite request to the private address of relay agent 110B and forwards the SIP Invite request to relay agent 110B at the port used to send the FWPP in step 10 (step 17). Relay agent 110B receives the modified SIP Invite request and forwards the SIP Invite request to the IP PBX 50B at 192.168.2.100:5060, which is the address specified in the destination IE of the punch firewall request sent at step 10 (step 18). IP PBX 50B rings the phone at extension 1000 (step 19). IP PBX 50B may send one or more SIP provisional responses to the SIP proxy 130 while waiting for User B to answer.

When User B answers the phone, an indication is sent to IP PBX 50B (step 20). IP PBX 50B accepts the SIP Invite request by sending a SIP 200 OK response with a media description to the address (216.218.42.170:7000) specified in the topmost VIA of the SIP Invite request. This is the public address of the SIP proxy 130. The SIP 200 OK response is shown below:

```
SIP/2.0 200 OK
Via: SIP/2.0/UDP 16.218.42.170:branch=z9hG4bK241f491779;
received=192.168.2.50
Via: IP/2.0/UDP192.168.1.100:5060;received=216.218.42.173;
branch=z9hG4bK241f491779
From: <sip:1000@192.168.1.100>;tag=cfa850bf-a180-4e71-9b81-
62d43df3a4f0-21178205
To: <sip:5146661000@dc.acme.com>;tag=cfa850bf-a180-4e71-9b81-
62d43df3a4f0-26002145
Date: Fri, 29 Jan. 2010 19:48:06 GMT
Call-ID: 4dc24600-b63140a5-18-6401a8c0@192.168.1.100
CSeq: 101 INVITE
Allow: INVITE, OPTIONS, INFO, BYE, CANCEL, ACK, PRACK,
UPDATE, REFER, SUBSCRIBE, NOTIFY, PUBLISH
Allow-Events: presence, kpml
Remote-Party-ID: <sip:1000@192.168.2.100>;party=called;screen=yes;
privacy=off
Contact: <sip:1000@192.168.2.100:5060>

Record-Route: <sip:192.168.2.50:7000;ftag=cfa850bf-a180-4e71-9b81-
62d43df3a4f0-21178205;1r>,<sip:192.168.1.50:7000;ftag=cfa850bf-
a180-4e71-9b81-62d43df3a4f0-21178205;1r>
```

-continued

```
Supported: replaces
Session-Expires: 1800;refresher=uas
Require: timer
Content-Type: application/sdp
Content-Length: 214
v=0
o=CiscoSystemsCCM-SIP 2000 1 IN IP4 192.168.2.100
s=SIP Call
c=IN IP4 192.168.2.200
t=0 0
m=audio 24582 RTP/AVP 0 101 a=rtpmap:0 PCMU/8000
a=ptime:20
a=rtpmap:101 telephone-event/8000
a=fmtp:101 0-15
```

The media description of the SIP 200 OK response contains the IP address (192.168.2.200) and port (24582) of User's B's user equipment (UE B) for the media connection. The CONTACT header field contains the private address (192.168.2.100:5060) of the IP PBX 50B.

The SIP 220 OK response is sent to the relay agent (step 21). Upon receipt of the SIP Invite response, relay agent 110B relays the SIP Invite response (step 22). The firewall/NAT 30B intercepts the SIP 200 OK response and forwards the response to the SIP proxy 130 (step 23). SIP proxy 130 notifies the application server 140 that a SIP 200 OK response was received for the SIP transaction (step 24).

At this point, the application server 140 needs to open connections through firewall/NAT 30B for RTP and RTCP traffic. Also, a signaling connection is needed to enable the calling party to send a SIP ACK request acknowledging the SIP 200 OK response. The application server 140 sends one or more punch firewall requests to relay agent 110B indicating that open ports are needed for RTP and RTCP traffic and for SIP requests (step 25). The target IE of the punch firewall requests for both RTP and RTCP traffic contains the IP address of the firewall/NAT 30A with the port number 5353 appended. This is the apparent public source address for media packets sent by User A. For the RTP connection, the destination IE of the Punch Firewall request contains the private address (192.168.2.200:24582) of User B's phone for RTP traffic. For the RTCP connection, the destination IE of the Punch Firewall request contains the private address (192.168.2.200:24583) of User B's phone for RTCP traffic. To open a port for SIP requests, the target IE for the punch firewall request is the public address (216.218.42.170:7000) of the SIP Proxy 130 and the destination IE is the private address (192.168.2.100:5060) identified in the CONTACT header field of the SIP 200 OK response. The relay agent 110B implements the firewall punching procedure to open connections for RTP and RTCP traffic and reports the public addresses opened for RTP and RTCP traffic respectively to the application server 140 (step 26). In this example, the public address for RTP traffic is 216.218.42.172:4816. The public address for RTCP traffic is 216.218.42.172:4818. The relay agent 110B also reports the public address opened for the called party CONTACT, which in this example is 216.218.42.172:4812.

Ports also need to be reserved by relay agent 110A for RTP and RTCP traffic. The application server 140 sends Port Reservation requests to relay agent 110A to reserve ports at relay agent 110A for media traffic (step 27). The Port Reservation requests include the public addresses at firewall/NAT 30B returned in step 26 in the destination IE. In response to the Port Reservation requests, the relay agent 110A reserves two consecutive ports for RTP and RTCP traffic respectively, and returns the private addresses of the reserved ports to the application server 140 in a response to the Port Reservation requests (step 28). In this example, port 2070 is reserved for RTP and port 2071 is reserved for RTCP. The application server 140 relays the private addresses to the SIP proxy 130 for modification of the SIP Response (step 29).

The SIP proxy 130 modifies the SIP response to include address information received from relay agent 110A (step 30). More specifically, the SIP proxy 130 removes the topmost VIA and modifies the media description so that RTP address points to the address (192.168.1.50:2070) of the port reserved by the relay agent 110A for RTP traffic. The modified SIP 200 OK response is shown below with changes highlighted:

```
SIP/2.0 200 OK
Via: SIP/2.0/UDP 216.218.42.170:7000;branch=z9hG4bK241f491779;
received=192.168.2.50
Via: SIP/2.0/UDP 192.168.1.100:5060;received=216.218.42.173;
branch=z9hG4bK241f491779
From: <sip:1000@192.168.1.100>;tag=cfa850bf-a180-4e71-9b81-
62d43df3a4f0-21178205
To: <sip:5146661000@dc.acme.com>;tag=cfa850bf-a180-4e71-9b81-
62d43df3a4f0-26002145
Date: Fri, 29 Jan. 2010 19:48:06 GMT
Call-ID: 4dc24600-b63140a5-18-6401a8c0@192.168.1.100
CSeq: 101 INVITE
Allow: INVITE, OPTIONS, INFO, BYE, CANCEL, ACK, PRACK,
UPDATE, REFER, SUBSCRIBE, NOTIFY, PUBLISH
Allow-Events: presence, kpml
Remote-Party-ID: <sip:1000@192.168.2.100>;party=called;screen=yes;
privacy=off
Contact: <sip:1000@192.168.2.100:5060>
Record-Route: <sip:192.168.2.50:7000;ftag=cfa850bf-a180-4e71-9b81-
62d43df3a4f0-21178205;1r>,<sip:192.168.1.50:7000;ftag=cfa850bf-
a180-4e71-9b81-62d43df3a4f0-21178205;1r>
Supported: replaces
Session-Expires: 1800;refresher=uas
Require: timer
Content-Type: application/sdp
Content-Length: 211 v=0
o=CiscoSystemsCCM-SIP 2000 1 IN IP4 192.168.2.100
s=SIP Call
c=IN IP4 192.168.1.50 t=0 0
m=audio 2070 RTP/AVP 0 101 a=rtpmap:0 PCMU/8000
a=ptime:20
a=rtpmap:101 telephone-event/8000
a=fmtp:101 0-15
```

The SIP proxy 130 sends the modified SIP 200 OK response to the public address (216.218.42.173:2064) for the port in firewall/NAT 30A that was opened for the VIA connection (step 31). The firewall punching procedure previously performed by relay agent 110A created a binding between the public address of the port opened by firewall/NAT 30A and the private address at relay agent 110A for the VIA connection. Thus, firewall/NAT 30A translates the public address to the private address of relay agent 110A and forwards the response to relay agent 110A (step 32). Relay agent 110A receives the modified SIP 200 OK response and, in turn, forwards the SIP response to IP PBX 50A at 192.168.1.100: 5060, the address originally specified in the VIA header of the original SIP Invite request (step 33).

IP PBX 50A processes the SIP Response (step 34). To complete the SIP dialog, IP PBX 50A sends a SIP ACK request to relay agent 110A (step 35). It may be noted that in SIP, ACK is a request and not a response. It is therefore sent to the address specified in the first record route, which was created by adding a RECORD ROUTE entry in the SIP Invite that points to the relay agent 110A. Relay agent 110A relays the SIP ACK request to the SIP proxy 130 (step 36). The firewall NAT 30A receives the SIP ACK request and forwards it to the SIP proxy (step 37). The SIP proxy 130 notifies the application server 140 that the ACK request was received (step 38). The application server 140 sends a reply to the SIP proxy 130 containing the address at relay agent 110B where the SIP ACK request is to be sent (step 39) The SIP proxy 130 relays the SIP ACK request to the relay agent 110B (step 40). The relay agent 110B in turn forwards the ACK request to IP PBX 50B (step 41). IP PBX 50B handles the ACK request and the dialog is established (step 42). At this point, open ports for signaling and media connections exist on firewall/NATs 30A and 30B and the call between User A and User B is established.

Figure 6:
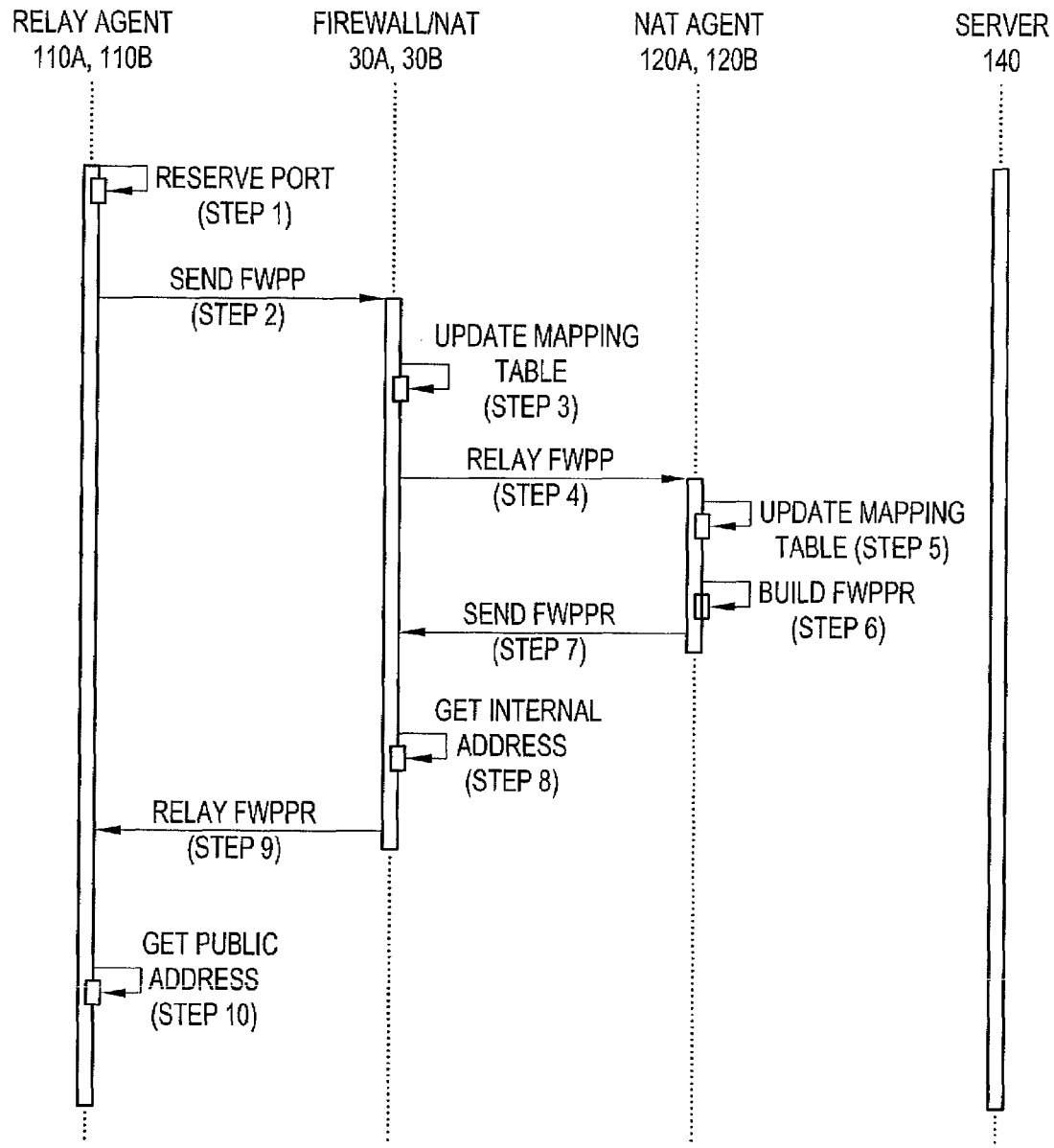
FIG. 6 illustrates a procedure for opening a signaling or media connection through a firewall.

FIG. 6 illustrates a firewall punching procedure for opening connections through a firewall. The firewall punching procedure is triggered by the relay agent 110A, 110B responsive to an event. For example, the event may comprise a request (e.g., Punch Firewall request from the application server 140) to open a "hole" in the corporate firewall/NAT 30A, 30B so that packets coming from a target device in the Internet, would be forwarded to an internal device in the private network (the destination device). In the case of a symmetric NAT, the relay agent 110A, 110B cannot simply open the hole on behalf of the destination device; it needs to remain in the path of the incoming packets from the target device.

To begin the firewall punching procedure, the relay agent 110A, 110B opens a socket and binds it to a port (step 1). The relay agent 110A, 110B sends a specially formed packet called the firewall punching packet (FWPP) from the port opened in step 1 to the target device address (step 2). The source address of the FWPP is the private relay agent address (agentip:agentport) from which the FWPP is sent and the destination address of the FWPP is the target device address (targetip:targetport). In the case where the firewall punching procedure is initiated in response to a Punch Firewall request from the application server 140, the target device address is the address specified in the target IE of the Punch Firewall request.

The corporate firewall/NAT 30A, 30B receives the FWPP on the LAN side and searches its NATing table to see if there is already an association between the private source address of the FWPP and the public destination address of the FWPP (step 3). If a matching entry is found, the firewall/NAT 30A, 30B updates the time to live of this NATing entry and sends the FWPP to the public destination address using the same public source address that was found in the table. If no matching entry is found, the firewall/NAT 30A, 30B reserves a public source address (natip:natport) creates a new entry in its NATing table associating the public source address (natip:natport) with the relay agent address (agentip:agentport) and target device address (targetip:targetport), and sends the FWPP to the destination address (targetip:targetport) from the public source address (natip:natport) it just reserved (step 4). The firewall/NAT 30A, 30B now routes any packet arriving at natip:natport from internetip to agentip:agentport.

The NAT agent 120A, 120B analyzes every packet sent from the WAN side of the firewall/NAT 30A, 30B to the internet service provider and is able to rapidly recognize a FWPP. Most packets except the FWPP (and a few other packets to be described below) are passed unmodified through the NAT agent 120A, 120B. The NAT Agent 120A, 120B, however, intercepts the FWPP and takes action depending on the target device address. If the target device address includes a predetermined "fixed" port (port 5353 in this example), the NAT agent 120A, 120B creates or updates an entry in its translation table (step 5). The entry comprises three components: the public source address (natip:natport) of the FWPP, the target device IP address (targetip), and a time stamp that is used to remove unused or stale entries. For all FWPPs, the NAT agent 120A, 120B extracts the public source address of the FWPP and builds a FWPP response (FWPPR) (step 6). The FWPPR includes in its payload the public source address (natip:natport) of the FWPP, which is the port opened in the firewall/NAT 30A, 30B. The FWPP is discarded.

The NAT Agent 120A, 120B sends a FWPPR back to the public source address (natip:natport) opened for the FWPP (step 7). When creating the FWPPR, the source and destination address in the FWPP are swapped. The firewall/NAT 30A, 30B receives the FWPPR on the public address opened for the FWPP, translates the public destination address of the FWPPR to the private address (agentip:agentport) of the relay agent 110A, 110B (step 8), and forwards the FWPPR to the relay agent (step 9).

The relay agent 110A, 110B receives the FWPPR on the port used to send the FWPP (opened in step 1) and reads the public source address contained in the payload of the FWPP (step 10). The relay agent 110A, 110B then stores the public address returned in the FWPPR by the NAT agent 120A, 120B. At this point, the relay agent 110A, 110B knows that if a packet is sent from the target device to the firewall/NAT 30A, 30B at natip:natport, will be relayed by the firewall/NAT 30A, 30B to the relay agent at agentip:agentport. The relay agent 110A, 110B keeps the socket for this connection open and forwards packets received over this socket to a destination device in the private network. When an open port is requested by the application server, the address of the destination device is specified in the destination IE of the Punch Firewall request and the relay agent 110A, 110B sends a Punch Firewall response containing the public source address (natip:natport) to the application server 140.

The design of the FWPP should enable the NAT agent 120A, 120B to rapidly identify an FWPP. To achieve these objectives, the FWPP design may have a fixed length and begin with a predetermined signature. Also, the FWPP may have a predetermined format that enables rapid analysis. Similarly, the FWPPR, is designed so that it may be easily constructed. With this objective in mind, the FWPP is designed with some unused bytes that can be used by the NAT agent 120A, 120B to insert the public source address. The FWPP is designed to allow the source and destination addresses to be easily swapped. Moreover, the packet design allows the NAT agent 120A, 120B to rapidly recalculate a checksum for the IP and UDP headers without recalculating the whole packet checksum.

In one exemplary embodiment, the FWPP is exactly 27 bytes long. Bytes 0-15 (16 bytes) contain a unique identifier (e.g. GUID). Byte 16 contains a packet type identifier which is set to 01 for a FWPP and is set to 02 for an FWPPR. Bytes 17-20 (4 bytes) contain a sequential unique ID generated by the relay agent 110A, 110B, used to match FWPPR responses to FWPP requests and therefore be able to discard responses to old requests. Bytes 21-24 (4 bytes) are reserved to contain the public IP address opened by the firewall/NAT 30A, 30B in the FWPPR packet. Bytes 26-27 (2 bytes) are reserved to contain the public port opened by the firewall/NAT 30A, 30B in the FWPPR packet.

Figure 7:
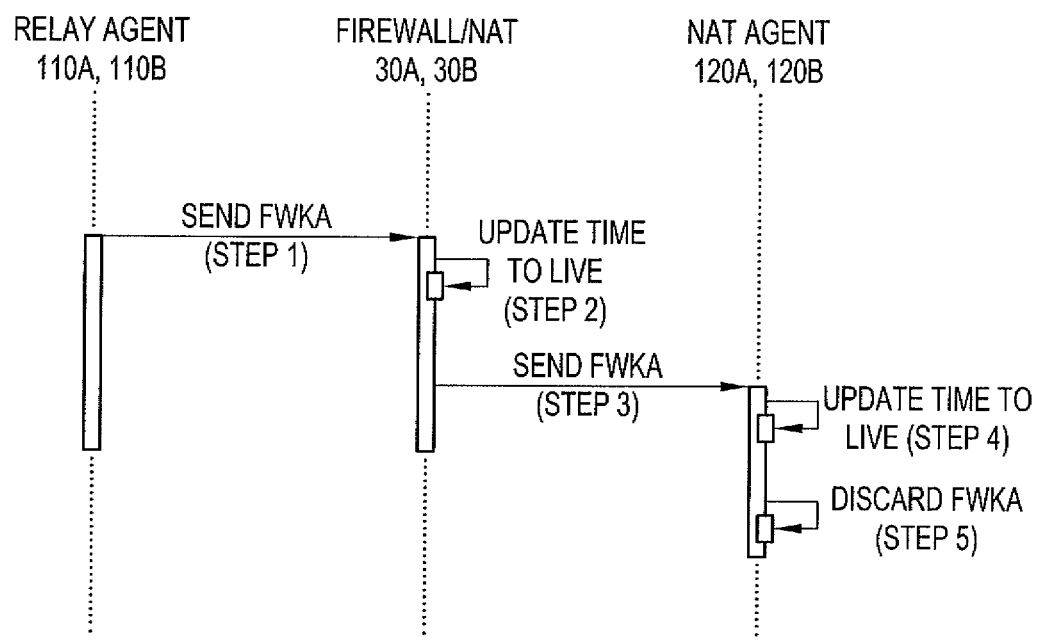
FIG. 7 illustrates a procedure for maintaining a signaling or media connection through a firewall.

Once an opening is made in the firewall/NAT 30A, 30B, a keep alive message should be sent to the firewall/NAT 30A, 30B periodically in order to maintain the open port. FIG. 7 illustrates an exemplary procedure for maintaining an open port on the NAT/firewall 30A, 30B. Every few seconds, the relay agent 110A, 110B sends a Firewall Keep Alive (FWKA) message to the firewall/NAT 30A, 30B (step 1). The FWKA message is sent to the same target address and from the same source address as the previous FWPP. The firewall/NAT 30A, 30B finds the existing entry in its binding table corresponding to the destination address of the FWKA and updates the time to live (step 2). The firewall/NAT 30A, 30B sends the FWKA to the destination address (step 3). The NAT Agent 120A, 120B intercepts the FWKA. If the destination address of the FWKA packet is addrNATx:5353, the NAT Agent 120A, 120B will update the time to live for the corresponding entry in its translation table (step 4). The NAT agent 120A, 120B then drops the FWKA (step 5).

In one exemplary embodiment, the FWKA packet is 17 bytes long. Bytes 0-15 (16 bytes) contain a GUID (a Unique identifier). Byte 16 (1 byte) contains a packet type indicator (e.g., 03 to indicate a FWKA).

Figure 8:
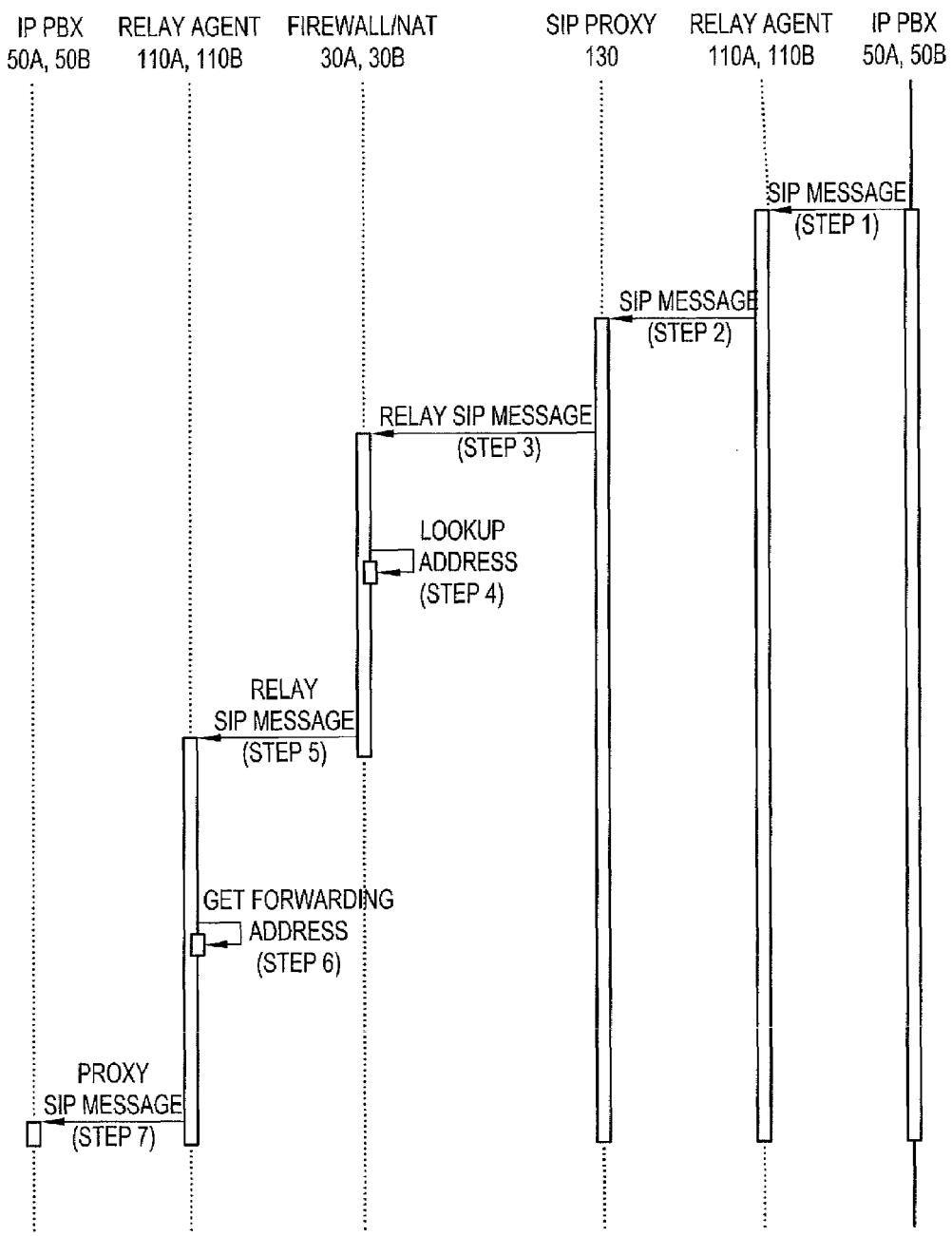
FIG. 8 illustrates message forwarding for signaling traffic in one embodiment of the invention.

FIG. 8 illustrates the path of SIP signaling messages after signaling connections have been established in accordance with the present invention. SIP signaling messages generated by the IP PBX 50A, 50B are sent to the local relay agent 110A, 110B (step 1). The local relay agent 110A, 110B forwards the SIP signaling message to the SIP proxy 130 (step 2), which relays the message to the public address of the port at the firewall/NAT 30A, 30B opened for the signaling connection (step 3). The firewall/NAT 30A, 30B looks up the corresponding private address in its binding table (step 4). As noted previously, the binding of the public address with the private address of the remote relay agent was created during the firewall punching procedure. The firewall/NAT 30A, 30B forwards the packet to the remote relay agent 110A, 110B (step 5). The relay agent 110A, 110B also includes a routing table that associates the port over which SIP signaling messages are received with the private address of the IP PBX 50A, 50B. The relay agent 110A, 110B looks up the internal address associated with the signaling port (step 6), which is the internal address of the IP PBX 50A, 50B. The relay agent 110A, 110B then forwards the SIP message to the remote IP PBX (step 7).

Figure 9:
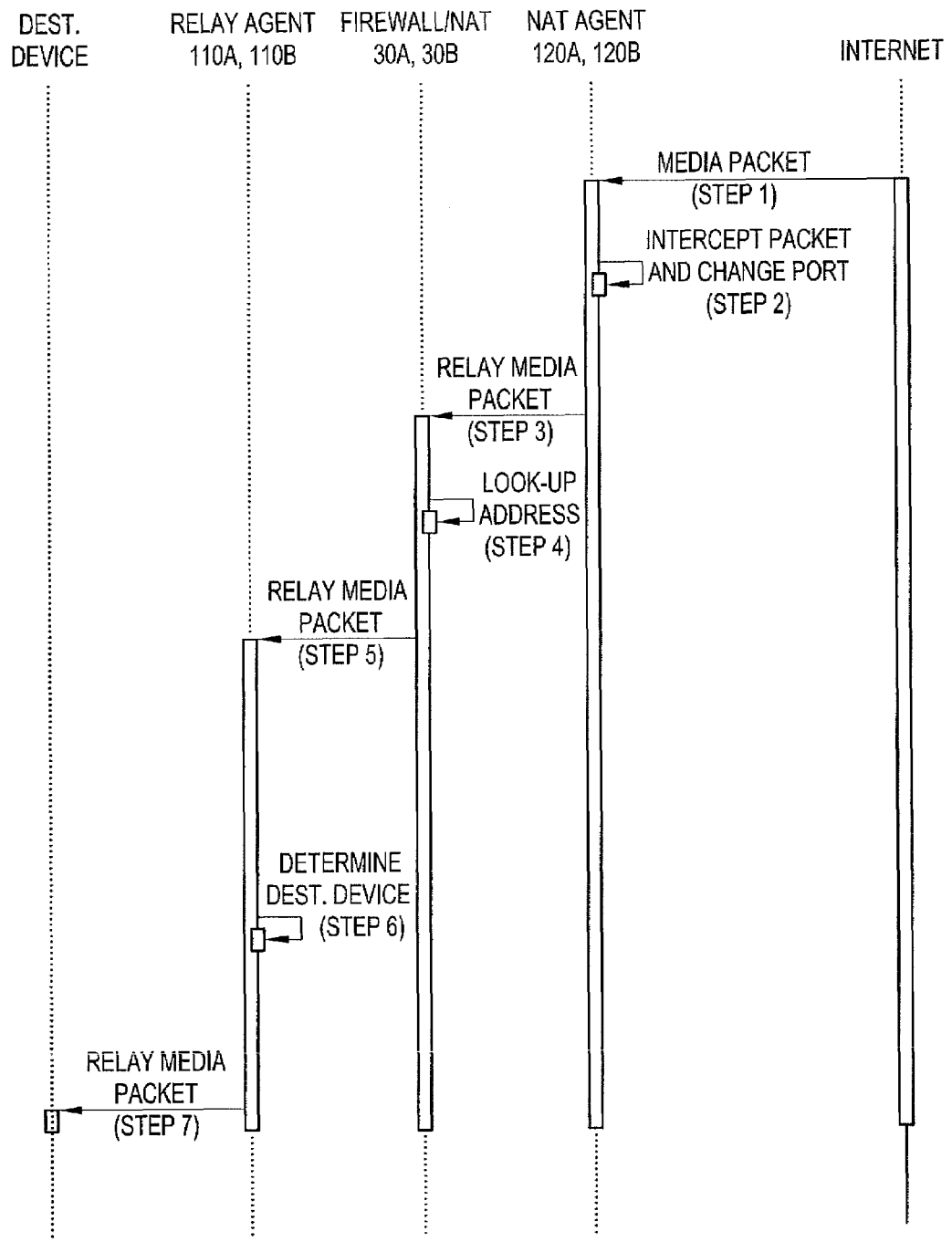
FIG. 9 illustrates message forwarding for media traffic in one embodiment of the invention.

FIG. 9 illustrates the route followed by RTP packets after media connections have been established. In this case, RTP packets originating from the user equipment are sent by the local relay agent 110A, 110B to the remote user's NAT Agent 120A, 120B (step 1). The remote user's NAT Agent 120A, 120B includes a translation table that associates the packet's public source IP address and destination address. The NAT Agent 120A, 120B changes the packet's source port to 5353 (step 2) and forwards the packet with the modified source address to the firewall/NAT 30A, 30B (step 3). The firewall/NAT 30A, 30B includes a binding table that associates the public destination address of the packet with a private destination address. The firewall/NAT 30A, 30B replaces the public destination address with the private destination address in its binding table (step 4) and forwards the packet to the relay agent 110A, 110B (step 5). The relay agent 110A, 110B remembers that packets received on a specific port need to be forwarded to another private address specified in a previous punch firewall request (step 6). That private address is the private address of the user's IP phone. The remote relay agent 110A, 110B substitutes the private address of the user's phone for the destination address contained in the data packet and forwards the data packet to the user's phone (step 7).

Figure 10:
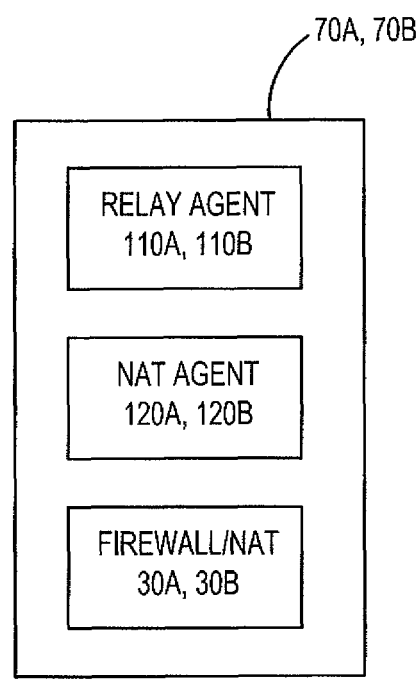
FIG. 10 illustrates a router in an alternate embodiment.

In another exemplary embodiment, the functionality of the relay agent 110A, 110B and NAT agent 120A, 120B can be incorporated into router 70A, 70B or other host device implementing the firewall/NAT 30A, 30B as shown in FIG. 10. In this case, there would be no need to punch the firewall using FWPP/FWKA packets as previously described. Instead, the router 70A, 70B itself could open the connections. The communication channel between the router 70A, 70B and the application server 140 could be built-in directly into the router code to circumvent the firewall/NAT 30A, 30B. The router 70A, 70B could reserve one or more ports (e.g., port 5060) to forward internal SIP traffic to the application server 140. The router 70A, 70B, could be configured via a browser interface as is known in the art.

When a router 70A, 70B containing the relay agent 110A, 110B and Nat agent 120A, 120B is enabled it would implement a start-up procedure and establish a connection with the application server 140. During the start-up procedure, the router 70A, 70B reserves a port (e.g., port 5060) on the internal network side to relay traffic to the application server 140. This private router address may be configured as a SIP trunk in the IP PBX 50A, 50B. The router 70A, 70B connects with the application server 140 optionally using a secure protocol, such as CORBA over SSL, by using a connection directly on the WAN side of the router 70A, 70B, thus eliminating the need for NAT traversal. The relay agent function 110A, 110B in the router 70A, 70B would still send keep alive signals to the application sever 140 to maintain the TCP connection with the application server 140. When the application server 140 requires port openings at the firewall/NAT 30A, 30B, the relay agent function 110A, 110B in the router 70A, 70B could initiate updates of the router's NATing table directly so that incoming SIP signaling packets are forwarded directly to the IP PBX 50A, 50B.

The RTP/RTCP port contiguity requirement may be addressed directly in the code of the router 70A, 70B by having the firewall/NAT 30A, 30B reserve two consecutive public ports for RTP and RTCP connections. Thus, there is no need for relay agent 110A, 110B at the remote end to function as an outbound proxy for RTP and RTCP traffic. In a mixed system where one end uses a router 70A, 70B with integrated relay agent 110A, 110B and NAT agent 120A, 120B, and the other end has a separate relay agent 110A, 110B and NAT agent 120A, 120B, the application server 140 could detect that the public ports on the end with an integrated system are consecutive and thus avoid creating the proxy ports in the relay agent 110A, 110B at the other end. In this case, the application server 140 could direct that the media packets be sent directly over the Internet instead of routing it through the relay agent 110A, 110B.

The need for a special treatment of incoming media traffic is still present, but the solution is different. The application server 140 could simply request the router 70A, 70B to reserve a public port and to route traffic on that port coming from a specific IP address (the remote firewall address) to the media endpoint in the private network 20A, 20B. Thus the need to modify the port number of incoming media packets is eliminated.

Figure 11A:
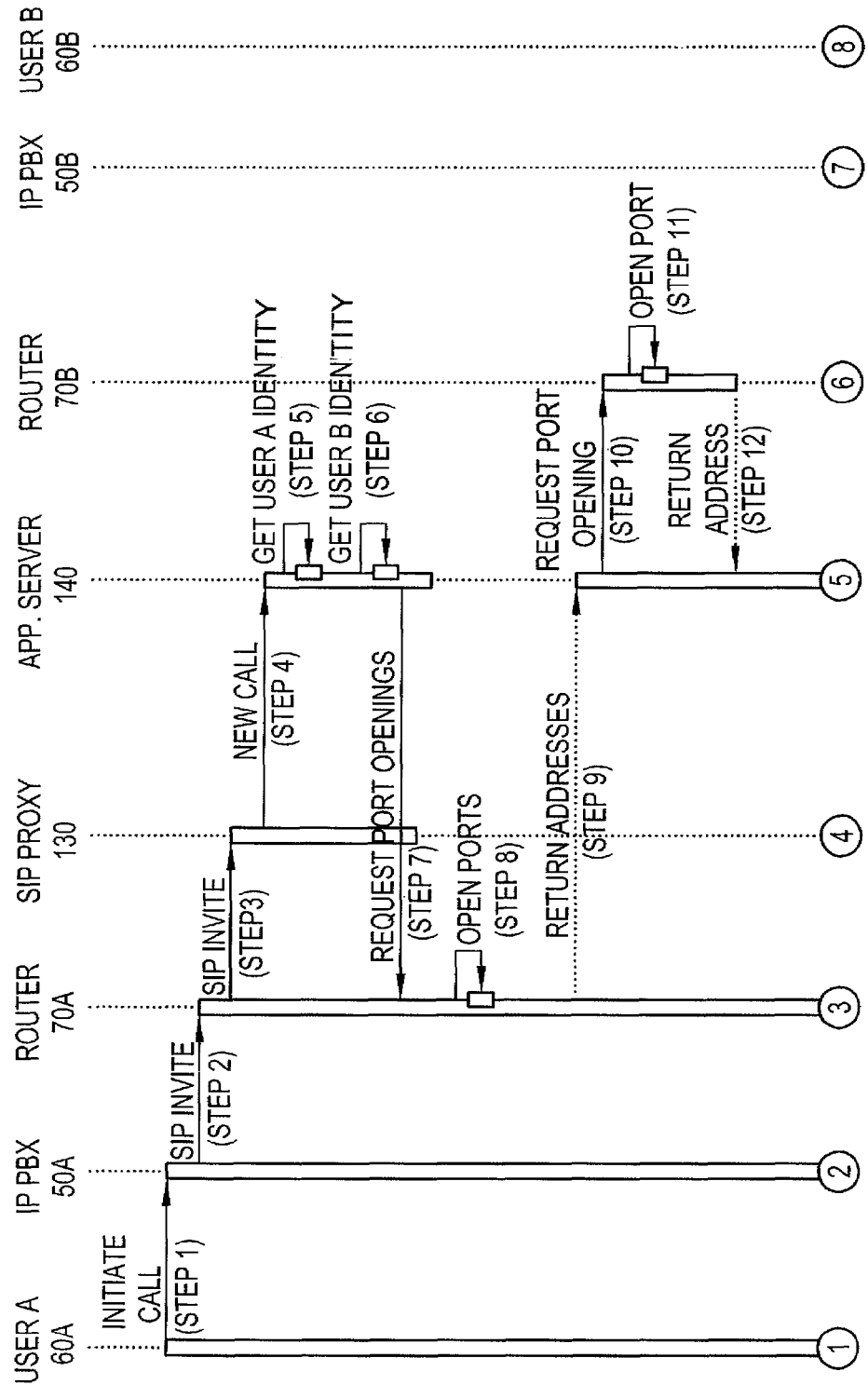
FIGS. 11A and 11B illustrate a procedure for establishing a communication session through a firewall according to another exemplary embodiment.
Figure 11B:
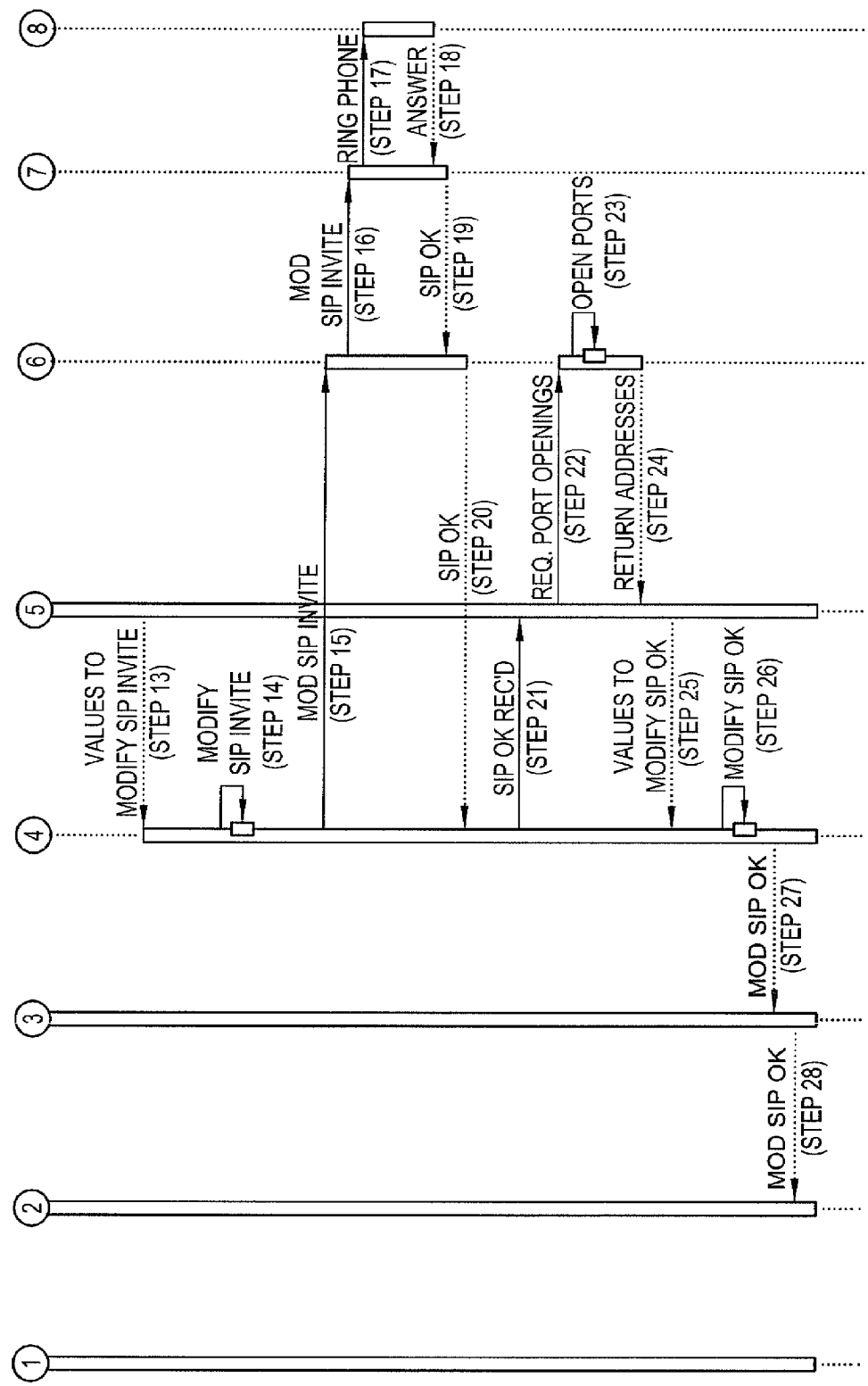

FIG. 11 illustrates an exemplary procedure for traversing a firewall in the scenario where the functionality of the relay agent 110A, 110B and NAT agent 120A, 120B, and firewall/NAT 30A, 30B is contained within a router 70A, 70B. The procedure begins when User A initiates a call by dialing the phone number of User B (step 1). The IP PBX 50A for User A generates a SIP Invite request and sends the SIP Invite request on a SIP trunk to the router 70A (step 2). The router 70A forwards the SIP Invite request to the SIP proxy 130 (step 3). The SIP proxy 130 notifies the application server 140 that a new call is being made (step 4). The application server 140 determines the identity of User A (step 5) and User B (step 6) from the contents of the SIP Invite request as previously described. The application server 140 then sends a request to the router 70A to open ports for signaling and media connections (step 7). Four ports are required: one for the CONTACT in the SIP Invite request, one for the VIA in the SIP Invite request, one for RTP, and one for RTCP as previously described. Router 70A opens ports in the firewall (step 8) and returns the addresses of the ports to the application server 140 (step 9).

The application server 140 then requests the router 70B to open a port for the SIP Invite request (step 10). The router 70B opens a port (step 11) and returns the address of the port to the application server (step 12). The application server 140 then returns values to the SIP proxy 130 to modify the SIP Invite (step 13). The SIP proxy 130 modifies the SIP Invite (step 14) and sends the modified SIP Invite to the port opened by router 70B (step 15). Router 70B forwards the modified SIP Invite to the IP PBX 50B (step 16) which rings the phone extension of User B (step 17).

When User B answers (step 18), IP PBX 50B sends a SIP OK response to the router 70B (step 19). The router 70B forwards the SIP OK to the SIP proxy 130 (step 20). The SIP proxy 130 notifies the application server 140 that a SIP OK response has been received (step 21). The application server 140 then sends a request to the router 70B to open ports for RTP and RTCP connections and for an additional signaling connection for an acknowledgement of the SIP Response message (step 22). Router 70B opens ports for RTP and RTCP (step 23) and returns the addresses to the application server 140 (step 24). The application server 140 returns values to the SIP proxy 130 to modify the SIP OK response (step 25). The SIP proxy 130 modifies the SIP OK response (step 26) and sends the modified SIP OK response to the router 70A. Router 70A forwards the modified SIP OK response to the IP PBX 50A (step 28). While not shown in FIG. 11, the IP PBX 50A sends a SIP ACK request to establish the SIP dialogue.

Figure 12:
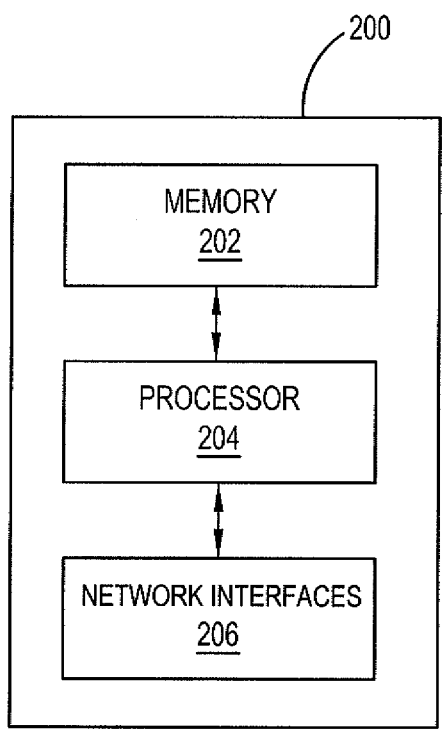
FIG. 12 illustrates an exemplary host device to implement functional components of the present invention such as the relay agent, Nat agent, SIP proxy, and application server.

FIG. 12 illustrates an exemplary host device 200 to implement functional components of the present invention such as the relay agent 110A, 110B, NAT agent 120A, 120B, SIP proxy 130, application server 140, and router 70A, 70B. The host device 200 comprises one or more network interfaces 206 to connect the host device with a private network, a public network, or both, a processor 204 to implement the procedures described herein, and a memory 202 to store program code and data for implementing the procedures described herein. The processor 204 may comprise one or more microprocessors, hardware, or a combination thereof. Memory 202 may comprise both volatile memory (e.g., RAM) for strong temporary data and non-volatile memory (e.g. ROM, EEPROM) for storing program code and configuration data.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of opening a port in a firewall, the method comprising:
  intercepting a firewall punching packet transmitted over a firewall port to a target address in a public network, the firewall punching packet including a public source address indicating the firewall port over which the packet was transmitted;

sending, in response to the firewall punching packet, a reply message to the public source address specified in the firewall punching packet, the reply message comprising a payload that contains the public source address of the firewall punching packet;

if the target address of the firewall punching packet contains a predetermined port number, creating an entry in a mapping table associating a target IP address of the firewall punching packet with the public source address of the firewall punching packet;

intercepting a packet sent to the firewall;

if the source IP address and destination address of the intercepted packet matches an entry in the mapping table, modifying the source address of the intercepted packet to match the target address of the firewall punching packet; and forwarding the modified packet to the firewall.

2. A device for opening a port in a firewall, the device comprising:

a network interface for connecting said device with a private network protected by said firewall; and a processor connected to said network interface and configured to:

intercept a firewall punching packet transmitted over a firewall port to a target address in a public network, the firewall punching packet including a public source address indicating the firewall port over which the packet was transmitted;

send, in response to the firewall punching packet, a reply message to the public source address specified in the firewall punching packet, the reply message comprising a payload that contains the public source address of the firewall punching packet;

if the target address of the firewall punching packet contains a predetermined port number, create an entry in a mapping table associating a target IP address of the firewall punching packet with the public source address of the firewall punching packet;

intercept a packet sent to the firewall;

if the source IP address and destination address of the intercepted packet matches an entry in the mapping table, modify the source address of the intercepted packet to match the target address of the firewall punching packet; and forward the modified packet to the firewall.

\* \* \* \* \*